US012299927B2

(12) United States Patent
Wang et al.

(10) Patent No.: US 12,299,927 B2
(45) Date of Patent: May 13, 2025

(54) APPARATUS AND METHODS FOR THREE-DIMENSIONAL POSE ESTIMATION

(71) Applicant: Intel Corporation, Santa Clara, CA (US)

(72) Inventors: Shandong Wang, Beijing (CN); Yangyuxuan Kang, Beijing (CN); Anbang Yao, Beijing (CN); Ming Lu, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 137 days.

(21) Appl. No.: 18/000,389

(22) PCT Filed: Jun. 26, 2020

(86) PCT No.: PCT/CN2020/098306
§ 371 (c)(1),
(2) Date: Nov. 30, 2022

(87) PCT Pub. No.: WO2021/258386
PCT Pub. Date: Dec. 30, 2021

(65) Prior Publication Data
US 2023/0298204 A1    Sep. 21, 2023

(51) Int. Cl.
*G06T 17/00* (2006.01)
*G06T 7/73* (2017.01)
*G06T 19/20* (2011.01)

(52) U.S. Cl.
CPC ............. *G06T 7/74* (2017.01); *G06T 17/00* (2013.01); *G06T 19/20* (2013.01);
(Continued)

(58) Field of Classification Search
CPC ........... G06T 7/74; G06T 17/00; G06T 19/20; G06T 2207/20081; G06T 2207/20084;
(Continued)

(56) References Cited

U.S. PATENT DOCUMENTS 8,615,105 B1   12/2013  Cheng et al.
9,916,508 B2    3/2018  Pillai et al.
(Continued)

FOREIGN PATENT DOCUMENTS

CN    108108674    6/2018
CN    108629801   10/2018
(Continued)

OTHER PUBLICATIONS

Min Xin et al., "Motion Capture Research: 3D Human Pose Recovery Based on RGB Video Sequences," Applied Sciences, vol. 9, No. 17, Sep. 2, 2019, pp. 1-22, XP55885594, DOI: 10.3390/app9173613, 22 pages.
(Continued)

*Primary Examiner* — Sarah Lhymn
(74) *Attorney, Agent, or Firm* — Hanley, Flight & Zimmerman, LLC

(57) ABSTRACT

Apparatus and methods for three-dimensional pose estimation are disclosed herein. An example apparatus includes an image synchronizer to synchronize a first image generated by a first image capture device and a second image generated by a second image capture device, the first image and the second image including a subject; a two-dimensional pose detector to predict first positions of keypoints of the subject based on the first image and by executing a first neural network model to generate first two-dimensional data and predict second positions of the keypoints based on the second image and by executing the first neural network model to generate second two-dimensional data; and a
(Continued)

three-dimensional pose calculator to generate a three-dimensional graphical model representing a pose of the subject in the first image and the second image based on the first two-dimensional data, the second two-dimensional data, and by executing a second neural network model.

20 Claims, 13 Drawing Sheets

(52) U.S. Cl.
CPC .............. *G06T 2207/10016* (2013.01); *G06T 2207/20081* (2013.01); *G06T 2207/20084* (2013.01); *G06T 2207/30196* (2013.01); *G06T 2207/30244* (2013.01)

(58) Field of Classification Search
CPC ... G06T 2207/30244; G06T 7/55; G06T 7/73; G06T 2207/30241; G06T 7/38; G06T 7/75; G06T 7/344; G06T 17/20
See application file for complete search history.

(56) References Cited

U.S. PATENT DOCUMENTS

| | | | |
|---|---|---|---|
| 9,948,902 | B1 | 4/2018 | Trundle |
| 10,176,405 | B1 | 1/2019 | Zhou et al. |
| 10,304,191 | B1 | 5/2019 | Mousavian et al. |
| 10,321,728 | B1* | 6/2019 | Koh .......................... G06T 7/11 |
| 10,332,264 | B2 | 6/2019 | Schulter et al. |
| 10,402,983 | B2 | 9/2019 | Schulter et al. |
| 10,430,966 | B2 | 10/2019 | Varadarajan et al. |
| 10,733,441 | B2 | 8/2020 | Mousavian et al. |
| 10,839,543 | B2* | 11/2020 | Cheng ................... G06V 10/454 |
| 10,853,970 | B1* | 12/2020 | Akbas .................... G06T 1/0007 |
| 11,715,213 | B2 | 8/2023 | Leung et al. |
| 12,095,973 | B2 | 9/2024 | Bylicka et al. |
| 2013/0322720 | A1 | 12/2013 | Hu et al. |
| 2015/0095360 | A1 | 4/2015 | Vrcelj et al. |
| 2016/0267331 | A1 | 9/2016 | Pillai et al. |
| 2017/0316578 | A1* | 11/2017 | Fua .......................... G06T 7/246 |
| 2018/0130215 | A1 | 5/2018 | Schulter et al. |
| 2018/0130216 | A1 | 5/2018 | Schulter et al. |
| 2018/0173969 | A1 | 6/2018 | Pillai et al. |
| 2018/0293445 | A1 | 10/2018 | Gao |
| 2018/0350105 | A1* | 12/2018 | Taylor ...................... G06T 7/162 |
| 2019/0026917 | A1 | 1/2019 | Liao et al. |
| 2019/0066326 | A1 | 2/2019 | Tran et al. |
| 2019/0171909 | A1 | 6/2019 | Mandal et al. |
| 2019/0220992 | A1 | 7/2019 | Li et al. |
| 2019/0278983 | A1* | 9/2019 | Iqbal ........................ G06N 3/084 |
| 2019/0340432 | A1 | 11/2019 | Mousavian et al. |
| 2019/0371080 | A1* | 12/2019 | Sminchisescu ......... G06T 17/20 |
| 2020/0058137 | A1* | 2/2020 | Pujades .................. G06V 40/23 |
| 2020/0074678 | A1 | 3/2020 | Ning et al. |
| 2020/0082180 | A1 | 3/2020 | Wang |
| 2020/0126297 | A1* | 4/2020 | Tian ........................ G06T 7/0012 |
| 2020/0160102 | A1 | 5/2020 | Bruna et al. |
| 2020/0193628 | A1 | 6/2020 | Chakraborty |
| 2020/0327418 | A1* | 10/2020 | Lyons ...................... G06N 3/126 |
| 2020/0347222 | A1 | 11/2020 | Kawabata et al. |
| 2020/0364454 | A1 | 11/2020 | Mousavian et al. |
| 2020/0372246 | A1* | 11/2020 | Chidananda ........... G06N 3/084 |
| 2020/0401793 | A1 | 12/2020 | Leung et al. |
| 2021/0000404 | A1* | 1/2021 | Wang ...................... G16H 50/20 |
| 2021/0042520 | A1* | 2/2021 | Molin ..................... G06V 40/18 |
| 2021/0097718 | A1* | 4/2021 | Fisch ...................... G06V 40/23 |
| 2021/0097759 | A1* | 4/2021 | Agrawal ................ G06T 19/20 |
| 2021/0112238 | A1 | 4/2021 | Bylicka et al. |
| 2021/0117648 | A1 | 4/2021 | Yang et al. |
| 2021/0192783 | A1* | 6/2021 | Huelsdunk ............... G06T 7/75 |
| 2021/0209797 | A1 | 7/2021 | Lee |
| 2021/0350555 | A1* | 11/2021 | Fischetti .................. G06T 7/73 |
| 2021/0366146 | A1 | 11/2021 | Khamis et al. |
| 2022/0172429 | A1 | 6/2022 | Tong |
| 2022/0343639 | A1 | 10/2022 | Li et al. |
| 2022/0351535 | A1 | 11/2022 | Tao et al. |
| 2023/0186567 | A1* | 6/2023 | Koh ........................ G06F 30/12 |
| | | | 345/419 |
| 2023/0298204 | A1 | 9/2023 | Wang |

FOREIGN PATENT DOCUMENTS

| | | | | |
|---|---|---|---|---|
| CN | 108830139 | A * | 11/2018 | ......... G06K 9/00369 |
| CN | 108960036 | | 12/2018 | |
| CN | 108960036 | A * | 12/2018 | ......... G06K 9/00369 |
| CN | 108986197 | | 12/2018 | |
| CN | 2019025729 | | 2/2019 | |
| CN | 109886090 | | 6/2019 | |
| CN | 109948587 | | 6/2019 | |
| CN | 110008913 | | 7/2019 | |
| CN | 110009722 | | 7/2019 | |
| CN | 110047101 | A | 7/2019 | |
| CN | 110458940 | | 11/2019 | |
| CN | 110516670 | | 11/2019 | |
| KR | 20190087258 | A | 7/2019 | |
| WO | 2019087258 | A1 | 5/2019 | |
| WO | 2021109118 | | 6/2021 | |
| WO | 2021120157 | | 6/2021 | |
| WO | 2021258386 | A1 | 12/2021 | |

OTHER PUBLICATIONS

International Searching Authority, "International Preliminary Report on Patentability," issued in connection with International Patent Application No. PCT/CN2019/123625, mailed on Jun. 16, 2022, 6 pages.

International Searching Authority, "International Preliminary Report on Patentability," issued in connection with International Patent Application No. PCT/CN2019/126906, mailed on Jun. 30, 2022, 5 pages.

United States Patent and Trademark Office, "Notice of Allowance and Fee(s) Due," issued in connection with U.S. Appl. No. 16/914,232, dated Dec. 14, 2022, 4 pages.

United States Patent and Trademark Office, "Notice of Allowance and Fee(s) Due," issued in connection with U.S. Appl. No. 16/914,232, dated Mar. 15, 2023, 8 pages.

European Patent Office, "Extended European Search Report," issued in connection with European patent Application No. 20941827.6, dated Feb. 29, 2024, 9 pages.

International Searching Authority, "International Preliminary Report on Patentability," issued in connection with International Patent Application No. PCT/US2021/050609, mailed on Jul. 6, 2023, 7 pages.

United States Patent and Trademark Office, "Non-Final Office Action," issued in connection with U.S. Appl. No. 17/131,433, dated Feb. 15, 2024, 11 pages.

Rhodin et al., "Learning Monocular 3D Human Pose Estimation from Multi-view Images," Mar. 24, 2018, Retrieved from the Internet: <https://arxiv.org/abs/1803.04775>, 10 pages.

Joo et al., "Panoptic Studio: A Massively Multiview System for Social Interaction Capture," Dec. 9, 2016, Retrieved from the Internet: <https://arxiv.org/abs/1612.03153> 14 pages.

Schwarcz et al., "3D Human Pose Estimation from Deep Multi-View 2D Pose," Feb. 7, 2019, Retrieved from the Internet: <https://arXiv:1902.02841v1> 6 pages.

Qiu et al., "Cross View Fusion for 3D Human Pose Estimation," Sep. 3, 2019, Retrieved from the Internet: <https://arxiv.org/abs/1909.01203> 10 pages.

Dong et al., "Fast and Robust Multi-Person 3D Pose Estimation from Multiple Views", Proceedings of the IEEE Conference on Computer Vision and Pattern Recognition, Retreived from the Internet: arXiv:1901.04111v1, Jan. 14, 2019, 10 pages.

Pavlakos et al., "Harvesting Multiple Views for Marker-less 3D Human Pose Annotations," Apr. 16, 2017, Retrieved from the Internet: <https://arxiv.org/abs/1704.04793> 10 pages.

(56) References Cited

OTHER PUBLICATIONS

Iskakov et al., "Learnable Triangulation of Human Pose," May 14, 2019, Retrieved from the Internet: <https://arXiv:905.05754v1> 9 pages.

International Searching Authority, "International Search Report and Written Opinion," issued in connection with International Patent Application No. PCT/CN2020/098306, mailed on Mar. 25, 2021, 11 pages.

International Searching Authority, "International Search Report and Written Opinion," issued in connection with International Patent Application No. PCT/CN2019/123625, mailed on Sep. 9, 2020, 10 pages.

International Searching Authority, "International Search Report and Written Opinion," issued in connection with International Patent Application No. PCT/CN2019/126906, mailed on Sep. 23, 2020, 9 pages.

Wang et al, "Person Re-identification with Cascaded Pairwise Convolutions," Jun. 18-23, 2018, IEEE/CVF Conference on Computer Vision and Pattern Recognition, Retrieved from the Internet: <https://ieeexplore.IEEE.org/document/8578257>, 9 pages.

Zhong et al., "Camera Style Adaptation for Person Re-identification", Proceedings of the IEEE Conference on Computer Vision and Pattern Recognition, Retrieved from the Internet: arXiv:1711.10295v2, Apr. 10, 2018, 10 pages.

International Searching Authority, "Written Opinion" issued in connection with Application No. PCT/US2021/050609, dated Dec. 28, 2021, 5 pages.

International Searching Authority, "International Search Report" issued in connection with Application No. PCT/US2021/050609, dated Dec. 28, 2021, 5 pages.

Intel, "2019 CES: Intel and Alibaba Team on New AI-Powered 3D Athlete Tracking Technology Aimed at the Olympic Games Tokyo 2020," Retrieved from the Internet: [https://newsroom.intel.com/news/intel-alibaba-team-ai-powered-3d-athlete-trackingtechnology-olympic-games-tokyo-2020/#gs.xy8m7c], Jan. 7, 2019, 4 pages.

"Human3.6M Dataset," Retrieved from the Internet: http://vision.imar.ro/human3.6m/description.php, 1 page.

United States Patent and Trademark Office, "Notice of Allowance and Fee(s) Due," issued in connection with U.S. Appl. No. 16/914,232, mailed Nov. 30, 2022, 9 pages.

United States Patent and Trademark Office, "Non-Final Office Action," issued in connection with U.S. Appl. No. 16/914,232, mailed Jul. 21, 2022, 13 pages.

Zheng et al., "Scalable Person Re-identification: A Benchmark," Computer Vision Foundation, 2015, 9 pages.

Hermans et al., "In Defense of the Triplet Loss for Person Re-Identification," arXiv:1703.07737v4 [cs.CV], Nov. 21, 2017, 17 pages.

Sun et al., "Beyond Part Models: Person Retrieval with Refined Part Pooling (and a Strong Convolutional Baseline)," arXiv:1711.09349v3 [cs.CV], Jan. 9, 2018, 10 pages.

Wang et al., "Learning Discriminative Features with Multiple Granularities for Person Re-Identification," arXiv:1804.01438v3 [cs.CV], Aug. 17, 2018, 9 pages.

Luo et al., "Bag of Tricks and a Strong Baseline for Deep Person Re-identification," arXiv:1903.07071v3 [cs.CV], Apr. 19, 2019, 9 pages.

Wojke et al., "Deep Cosine Metric Learning for Person Re-Identification," arXiv:1812.00442v1 [cs.CV], Dec. 2, 2018, 9 pages.

Zhong et al., "Random Erasing Data Augmentation," arXiv:1708.04896v2 [cs.CV], Nov. 16, 2017, 10 pages.

Schroff et al., "FaceNet: A unified Embedding for Face Recognition and Clustering," arXiv:1503.03832v3 [cs.CV], Jun. 17, 2015, 10 pages.

Zhang et al., "AlignedReID: Surpassing Human-Level Performance in Person Re-Identification," arXiv.1711.08184v2 [cs.CV], Jan. 31, 2018, 10 pages.

Felzenszwalb et al., "Object Detection with Discriminatively Trained Part Based Models," IEEE Trans on PAMI, 2010, 20 pages.

Zhang et al., "Part-based R-CNNs for Fine-grained Category Detection," arXiv: 1407.3867v1 [cs.CV], Jul. 15, 2014, 16 pages.

Andriluka et al., "2D Human Pose Estimation: New Benchmark and State of the Art Analysis," Computer Vision Foundation, 2014, 8 pages.

Sun et al., "Deep High-Resolution Representation Learning for Human Pose Estimation," arXiv:1902.09212v1 [cs.CV], Feb. 25, 2019, 12 pages.

Hu et al., "Squeeze-and-Excitation Networks," Computer Vision Foundation, 2018, 10 pages.

Zajdel et al., "Keeping Track of Humans: Have I Seen This Person Before?" ResearchGate, May 2005, 7 pages.

Intel, "Intel True View," https://www.intel.com/content/www/us/en/sports/technology/true-view.html, last accessed Feb. 24, 2023.

International Bureau, "International Preliminary Report on Patentability," issued in connection with International Appl. No. PCT/CN2020/098306, dated Dec. 13, 2022, 5 pages.

Fu et al., "Delving Deep into Multiscale Pedestrian Detection via Single Scale Feature Maps." Sensors 2018, vol. 18, No. 1063, Apr. 2, 2018, 17 pages.

Delannay et al., "Detection and Recognition of Sports (wo)men from Multiple Views," IEEE International Conference on Distributed Smart Cameras, Aug. 30, 2009, 7 pages.

Arbues-Sanguesa et al., "Multi-Person tracking by multi-scale detection in Basketball scenarios," arXiv:1907.04637v1, Jul. 10, 2019, 8 pages.

Chen et al., "Spatial-Temporal Attention-Aware Learning for Video-Based Person Re-Identification," IEEE Transactions on Image Processing, vol. 28, Issue 9, Sep. 2019, 14 pages.

United States Patent and Trademark Office, "Non-Final Office Action," issued in connection with U.S. Appl. No. 17/764,093, dated Apr. 24, 2024, 28 pages.

United States Patent and Trademark Office, "Notice of Allowance and Fee(s) Due," issued in connection with U.S. Appl. No. 17/131,433, dated May 16, 2024, 6 pages.

United States Patent and Trademark Office, "Non-Final Office Action," issued in connection with U.S. Appl. No. 17/764,100, dated Jun. 12, 2024, 10 pages.

United States Patent and Trademark Office, "Final Office Action," issued in connection with U.S. Appl. No. 17/764,093, dated Jul. 15, 2024, 29 pages.

United States Patent and Trademark Office, "Corrected Notice of Allowability," issued in connection with U.S. Appl. No. 17/131,433, dated Jul. 31, 2024, 3 pages.

Chen, Dapeng, et al. "Video Person Re-identification with Competitive Snippet-Similarity Aggregation and Co-attentive Snippet Embedding." 2018 IEEE/CVF Conference on Computer Vision and Pattern Recognition.

United States Patent and Trademark Office, "Non-Final Office Action," issued in connection with U.S. Appl. No. 17/764,093, dated Nov. 18, 2024, 36 pages.

United States Patent and Trademark Office, "Advisory Action," issued in connection with U.S. Appl. No. 17/764,093, dated Oct. 15, 2024, 3 pages.

United States Patent and Trademark Office, "Notice of Allowance and Fee(s) Due," issued in connection with U.S. Appl. No. 17/764,100, dated Jan. 13, 2025, 9 pages.

\* cited by examiner

US 12,299,927 B2

APPARATUS AND METHODS FOR THREE-DIMENSIONAL POSE ESTIMATION

RELATED APPLICATION

This patent claims priority to PCT Patent Application No. PCT/CN2020/098306, filed Jun. 26, 2020. PCT Patent Application No. PCT/CN2020/098306 is hereby incorporated herein by reference in its entirety. Priority to PCT Patent Application No. PCT/CN2020/098306 is hereby claimed.

FIELD OF THE DISCLOSURE

This disclosure relates generally to pose estimation and, more particularly, to apparatus and methods for three-dimensional pose estimation.

BACKGROUND

Pose estimation determines a pose (e.g., a position and orientation) of a subject (e.g., a human) or an object using image data. The image data is analyzed to, for example, identify positions of the subject's joints (e.g., an elbow, a knee, an ankle) in the image data that indicate the subject's pose. The pose information obtained from the image data can be used to analyze characteristics of the subject's body during performance of an activity such as a sport.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Figure 1:
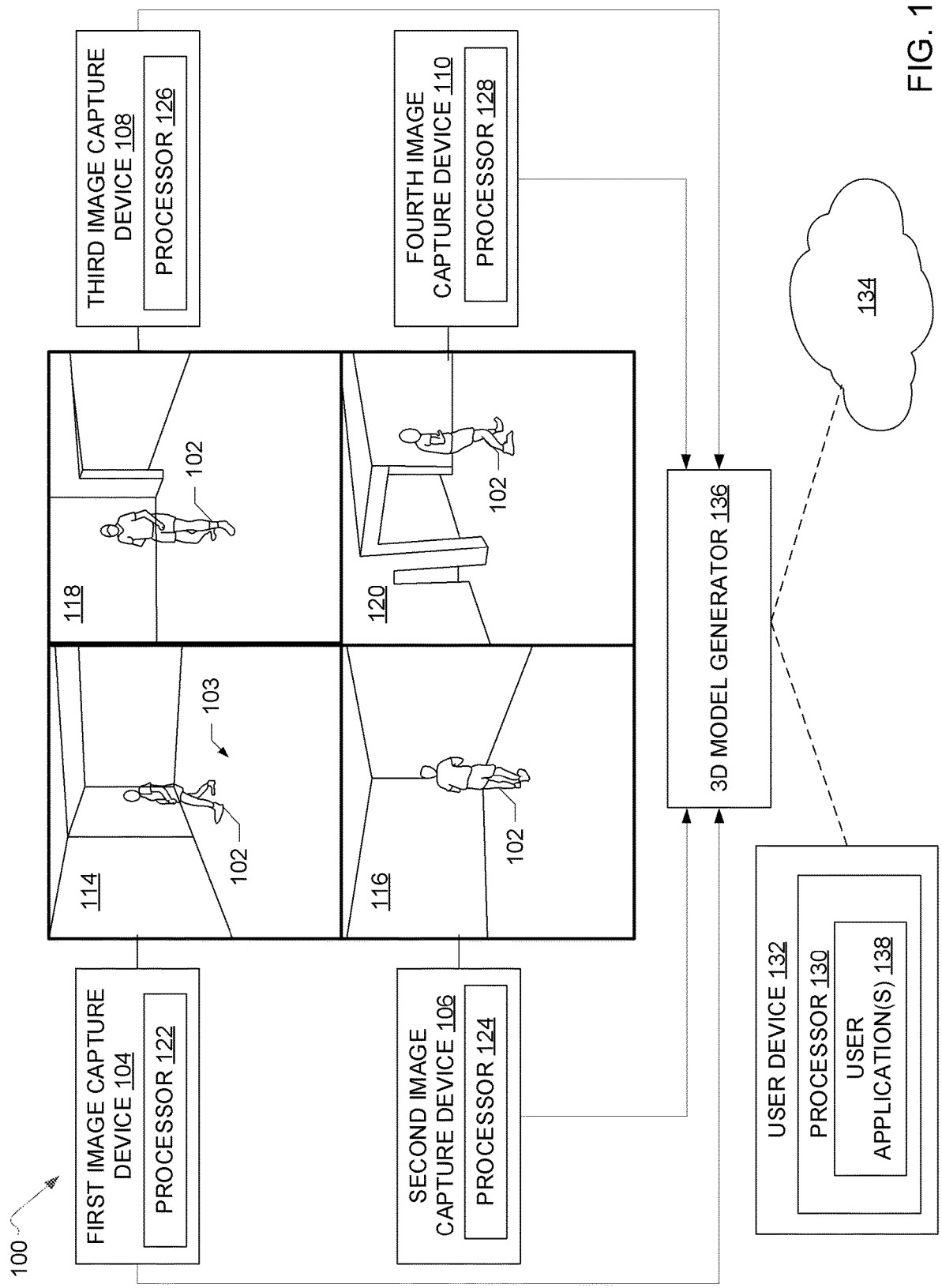
FIG. 1 is a block diagram of an example system including a three-dimensional (3D) model generator for generating 3D graphical models of a subject based on image data.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Pose estimation determines a pose (e.g., a position and orientation) of a subject (e.g., a human) or an object using image data. The image data is analyzed to, for example, identify positions of the subject's joints (e.g., an elbow, a knee, an ankle) in the image data that indicate the subject's pose. The pose information obtained from the image data can be used to analyze characteristics of the subject's body during performance of an activity such as a sport. Two-dimensional (2D) and/or three-dimensional (3D) graphical models (e.g., skeleton models) of the subject can be generated to illustrate the subject's pose based on the pose estimation data.

In some known 3D pose estimation techniques, image data generated by multiple cameras is analyzed to estimate a 2D pose of a subject captured in the image data based on joint or keypoint recognition. To generate a 3D graphical model of the subject in the pose, known pose estimation techniques may calculate locations of the joints of the user using the 2D pose data and methods such as triangulation, statistical modeling (e.g., pictorial structural modeling), and/or 3D geometric modeling techniques (e.g., volumetric voting, factor graph optimization).

However, such known 3D pose estimation techniques operate on an assumption that the cameras that generated the image data are static and that intrinsic parameters of the cameras (e.g., focal length) and extrinsic parameters of the cameras (e.g., a location and orientation of a camera relative to the environment) are known prior to analysis of the image data. Put another way, known 3D pose estimation techniques depend on multi-camera calibration. However, performing multi-camera calibration is resource- and time-consuming. Further, multi-camera calibration involving different types of cameras (e.g., pan/tilt camera(s), handheld camera(s)) is difficult. As a result, known 3D pose estimation techniques are difficult to implement for image data that has been collected using cameras with changing zoom levels and/or cameras that move during image generation. However, such cameras are often used in environments such as sporting events to capture movement of athletes.

Disclosed herein are example apparatus and methods for performing 3D pose estimation without performing calibration of the image capture devices (e.g., camera(s)) that are used to generate the image data from which the pose information is derived. To generate a 3D graphical model of the subject in a pose, examples disclosed herein perform 2D pose estimation to predict the location of joints of a subject using image data generated by a plurality of image capture devices. In examples disclosed herein, the image capture devices can include different types of image capture devices (e.g., long-range camera(s), pan/tilt camera(s)). In examples disclosed herein, a neural network regression analysis is performed to generate 3D graphical model(s) that show the subject in the pose from the 2D pose estimation data. Examples disclosed herein perform an optimization to estimate the 3D pose parameters (e.g., joint positions) and parameters of the image capture devices (e.g., extrinsic parameters such as device orientation). Examples disclosed herein output 3D graphical model(s) (e.g., skeleton models) that illustrate the subject in the pose and that account for the estimated parameters of the image capture devices without requiring the parameters of the image capture devices to be known beforehand. Example 3D graphical model(s) disclosed herein can be used for applications such as biomechanical analysis, 3D animation, human interaction recognition, etc.

In examples disclosed herein, a feed-forward neural network is implemented to regress the 3D poses from the 2D pose image data. The regressed 3D poses are used as calibration data to estimate parameters of the image capture devices and to account for multiple views of the subject in the pose obtained via the image capture devices. Parameters of the regressed 3D poses such as bone direction are identified to indicate joint rotation relative to a 3D skeleton template. An optimization is performed using the 2D and 3D pose data extracted from the image data and the estimated image capture device parameters to generate a 3D graphical model of the subject in the pose. Because examples disclosed herein do not reply on multi-camera calibration to perform the 3D pose estimation, examples disclosed herein can be implemented to provide for accurate 3D pose estimation using image data generated in dynamic environments where multi-camera calibration is difficult to perform, including sporting events such as figure skating and speed skating.

FIG. 1 illustrates an example system 100 constructed in accordance with teachings of this disclosure for estimating and tracking poses of a subject 102 located in an environment 103 and generating 3D graphical model(s) of the subject 102 based on the pose estimation. The example system 100 includes image capture devices to generate image data of the subject 102. In FIG. 1, the example system 100 includes a first image capture device 104, a second image capture device 106, a third image capture device 108, and a fourth image capture device 110 in the environment 103. The example system 100 of FIG. 1 can include additional or fewer image capture devices (e.g., two image capture devices, six image capture devices). The image capture devices 104, 106, 108, 110 can include, for instance, video cameras, still cameras, moveable cameras (e.g., pan/tilt cameras), long range cameras, and/or other types of image capture devices. In some examples, two or more of the image capture devices 104, 106, 108, 110 are different types of image capture devices and/or image capture devices having different properties. For example, the first image capture device 104 can be a static video camera while the second image capture device 106 can include a moveable video camera.

In the example of FIG. 1, the image capture devices 104, 106, 108, 110 are uncalibrated in that one or more of the intrinsic parameters (e.g., focal length, point of focus) and/or the extrinsic parameters (e.g., rotation, position) of the respective image capture devices 104, 106, 108, 110 are unknown and/or changing when the image capture devices 104, 106, 108, 110 generate image data. In the example of FIG. 1, the image capture devices 104, 106, 108, 110 can be spaced apart from one another in the environment 103 such that each image capture device 104, 106, 108, 110 has at least a partially different field of view of the environment 103. Each image capture device 104, 106, 108, 110 defines a respective image capture device coordinate system where a position of a 3D point (e.g., an (X, Y, Z) position) can be defined relative to the particular image device coordinate system. The coordinate system defined by each image capture devices 104, 106, 108, 110 is based on the locations of the image capture devices 104, 106, 108, 110 in the environment 103.

Each image capture device 104, 106, 108, 110 of FIG. 1 generates image data representing the subject 102 (e.g., a human being). For instance, as shown in FIG. 1, the first image capture device 104 generates a first image 114 including the subject 102 and the second image capture device 106 generates a second image 116 including the subject 102. The first image 114 and the second image 116 are generated by the respective device 104, 106 at substantially the same time (e.g., time-synchronized). As shown in FIG. 1, the view of the subject 102 in the first image 114 (e.g., a side profile view) is different than the view of subject 102 in the second image data 116 (e.g., a front view) due to the different locations of the first and second image capture devices 104, 106 in the environment 103. Similarly, in FIG. 1, the third image capture device 108 generates a third image 118 of the subject 102 and the fourth image capture device 108 generates a fourth image 120 of the subject 102. As shown in FIG. 1, the views of the subject 102 captured in each of the images 114, 116, 118, 120 differ based on the different field of views of the image capture devices 104, 106, 108, 110.

In the example of FIG. 1, each of the image capture devices 104, 106, 108, 110 capture images of the subject 102 over time to generate image data streams (e.g., sequences or series of images including, for instance, video frame, still images, etc.). The image capture devices are time-synchronized such that the image data generated by each image capture device captures the subject in the same pose, but from a different angle based on the position and/or orientation of the image capture device. Thus, the images captured by the image capture devices 104, 106, 108, 110 can be used to track movement of the subject 102 over time and, thus, changes in the poses of the subject 102. As disclosed herein, the image data generated by each of the image capture devices 102, 104, 106, 108 (where the image data generated by each device include the respective images 114, 116, 118, 120) is used to identify (e.g., predict) a pose of the subject 102 at a particular time corresponding to the time at which the respective image capture devices 104, 106, 108, 110 captured the images 114, 116, 118, 120 including the subject 102. The image data is used to generate a 3D graphical model of the subject 102 in the pose.

The example system 100 of FIG. 1 includes one or more semiconductor-based processors to process the image data generated by the image capture devices 104, 106, 108, 110. In some examples, the processor(s) are located at the image capture devices 104, 106, 108, 110. For example, the second, third, and fourth image capture devices 106, 108, 110 can transmit data to an on-board processor 122 of the first image capture device 104. Similarly, the respective first, second, third, and/or fourth image capture device 104, 106, 108, 110 can transmit data to an on-board processor 124 of the second image capture device 106, an on-board processor 126 of the third image capture device 108, and/or an on-board processor 128 of the fourth image capture device 110. In other examples, the image capture devices 104, 106, 108, 110 can transmit data to a processor 130 of another user device 132, such as a smartphone, a personal computing device (e.g., a laptop), etc. In other examples, the image capture devices 104, 106, 108, 110 can transmit data to a cloud-based device 134 (e.g., one or more server(s), processor(s), and/or virtual machine(s)).

In some examples, the processor(s) 122, 124, 126, 128 of the image capture device(s) 104, 106, 108, 110 are communicatively coupled to one or more other processors. In such examples, for instance, the second, third, and fourth image capture device(s) 106, 108, 110 can transmit image date including the images 116, 118, 120 to the on-board processor 122 of the first image capture device 104. The on-board processor 122 of the first image capture device 104 can then transmit the image data (including image date including the image 114 generated by the first image capture device 104) to the processor 130 of the user device 132 and/or the cloud-based device(s) 134. In some such examples, the image capture device 102 (e.g., the on-board processor 122) and the processor(s) 130, 134 are communicatively coupled via one or more wired connections (e.g., a cable) or wireless connections (e.g., cellular, Wi-Fi, or Bluetooth connections). Any of the on-board processors 122, 124, 126, 128 of the image capture devices 104, 106, 108, 110 can be communicatively coupled to the one or more other processors 130, 134. In other examples, the image data may only be processed by one or more of the on-board processors 122, 124, 126, 128 of the respective image capture devices 104, 106, 108, 110.

In the example of FIG. 1, the image data generated by the image capture devices 104, 106, 108, 110 is processed by a 3D model generator 136 to identify poses(s) of the subject 102 and to generate 3D graphical model(s) of the subject 102 in the pose(s). The 3D model generator 136 of FIG. 1 generates the 3D model(s) using the image data generated by the uncalibrated image capture devices 104, 106, 108, 110 (e.g., one or more of the intrinsic and/or extrinsic parameters of the image capture devices 104, 106, 108, 1110 are unknown to the 3D model generator 136). The 3D model generator 136 outputs the 3D graphical model(s) for presentation and/or analysis by user application(s) 138 (e.g. a body pose analysis application) installed on, for instance, the user device 132. In the example of FIG. 1, the 3D model generator 136 is implemented by executable instructions executed on one or more of the processor(s) 122, 124, 126, 128 of the image capture device(s) 104, 106, 108, 110. However, in other examples, the 3D model generator 136 is implemented by executable instructions executed on the processor 130 of the user device 132 and/or the cloud-based device(s) 134. In other examples, the 3D model generator 136 is implemented by dedicated circuitry located on one or more of the image capture devices 104, 106, 108, 110 and/or the user device 132. In some examples, one or more components of the example 3D model generator 136 are implemented by the on-board processor(s) 122, 124, 126, 128 of the image capture device(s) 104, 106, 108, 110 and one or more other components are implemented by the processor 130 of the user device 132 and/or the cloud-based device(s) 134. These components may be implemented in software, firmware, hardware, or in combination of two or more of software, firmware, and hardware.

In the example of FIG. 1, the 3D model generator 136 serves to process the image data generated by the image capture devices 104, 106, 108, 110 to perform 3D pose estimation and to generate 3D graphical model(s) that represent pose(s) in which the subject 102 is disposed in the image data. In some examples, the 3D model generator 136 receives the image data from each of the image capture devices 104, 106, 108, 110 in substantially real-time (as used herein "substantially real time" refers to occurrence in a near instantaneous manner (e.g., within one second) recognizing there may be real world delays for computing time, transmission, etc.). In other examples, the 3D model generator 136 receives the image data at a later time (e.g., periodically and/or aperiodically based on one or more settings (e.g., seconds later)). The 3D model generator 136 can perform one or more operations on the image data generated by the respective image capture devices 104, 106, 108, 110 such as filtering the image data and/or analyzing the data.

As disclosed herein, the 3D model generator 136 extracts images (e.g., video frames) from the image data feeds generated by each of the image capture devices 104, 106, 108, 110 and time-synchronizes the images obtained from each device 104, 106, 108, 110. The 3D model generator analyzes each set of synchronized images to predict positions of keypoints, or joints (e.g., elbow, wrist, pelvis), of the subject 102 in the images and to estimate a 2D pose of the subject based on the keypoints positions. The 3D model generator 136 can recognize the position of the keypoints in the image data based on keypoint recognition model(s) generated via neural network training. In examples disclosed herein, the 3D model generator 136 calculates (e.g., regresses) the 3D pose of the subject 102 from the 2D pose data based on learned neural network models, including a mapping of the 2D pose data to a joint depth offset map, where the joint depth offset map provides for the depth offset of a joint relative to a root joint (i.e., a reference joint) of the subject 102, such as a pelvis joint.

As mentioned above, each image capture device 104, 106, 108, 110 defines a respective coordinate system. In the example of FIG. 1, the 3D model generator 136 of FIG. 1 selects one of the image capture device coordinate systems, such as the coordinate system of the first image capture device 104, to serve as a world coordinate system, where the orientation of the first image capture device 104 defines the three coordinate axes (X, Y, Z) of the world coordinate system. In the example of FIG. 1, the 3D model generator 136 estimates the intrinsic and extrinsic parameters of the image capture devices 104, 106, 108, 110, such as device orientation (e.g., as defined by a rotation matrix), to enable the 3D joint information (e.g., an (X, Y, Z) joint position) of the subject 102 obtained from an image of a respective image capture device 104, 106, 108, 110 to be transformed from the coordinate system of the respective image capture device 104, 106, 108, 110 to the world coordinate system.

The 3D model generator 136 of FIG. 1 uses the 2D pose data, the 3D pose data, and the estimated parameters of the image capture devices 104, 106, 108, 110 to solve an optimization problem (e.g., by minimizing a least squares non-objective function). As a result of the optimization, the 3D model generator 136 of FIG. 1 generates a 3D graphical model of the subject in the pose relative to the world coordinate system (e.g., the coordinate system of the selected image capture device, such as the first image capture device 104). Thus, the 3D model generator 136 uses the different views of the subject 102 obtained from the image capture devices 104, 106, 108, 110 to generate a 3D graphical model that represents positions of the subject's joints independent of the position of the image capture device 104, 106, 108, 110 in the environment 103. The 3D graphical model(s) generated by the 3D model generator 136 can be transmitted to, for example, the user application(s) 138 of the user device 132 for analysis.

Figure 2:
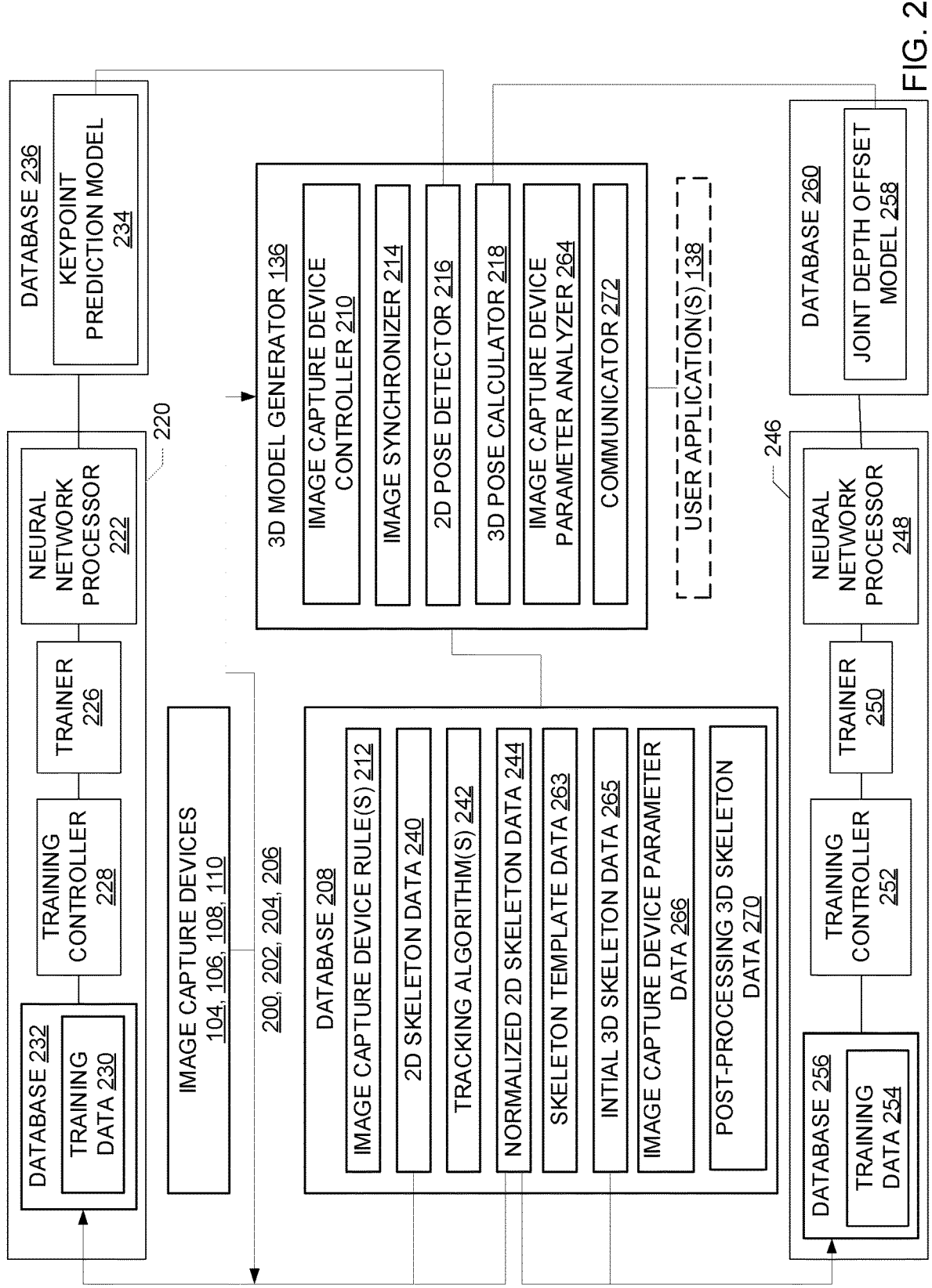
FIG. 2 is a block diagram of the example system of FIG. 1 including an example implementation of the 3D model generator and including one or more computing systems for training neural networks to generate models for use during 3D pose estimation in accordance with teachings of this disclosure.

FIG. 2 is a block diagram of an example implementation of the system 100 of FIG. 1 including an example implementation of the 3D model generator 136. As mentioned above, the 3D model generator 136 is constructed to identify (e.g., predict) pose(s) of a subject (e.g., the subject 102 of FIG. 1) using image data generated by image capture devices in an environment (e.g., the image capture devices 104, 106, 108, 110 in the environment 103 of FIG. 1) and to generate 3D graphical model(s) of the subject in a pose. In the example of FIG. 2, the 3D model generator 136 is implemented by one or more of the processor(s) 122, 124, 126, 128 of the image capture device(s) 104, 106, 108, 110, the processor 130 of the user device 132, and/or the cloud-based devices 134 (e.g., server(s), processor(s), and/or virtual machine(s) in the cloud 134 of FIG. 1). In some examples, some of the image data analysis is implemented by the 3D model generator 136 via a cloud-computing environment and one or more other parts of the analysis is implemented by one or more of the processor(s) 122, 124, 126, 128 of the image capture device(s) 104, 106, 108, 110 and/or the processor 130 of the user device 132 such as a smartphone.

As mentioned above, each of the image capture devices 104, 106, 108, 110 generates image data, where the image data includes a sequence or series of images (e.g., video frames, still images) of the subject 102 captured over time. As illustrated in FIG. 2, the example 3D model generator 136 receives a first image data stream 200 from the first image capture device 104 of FIG. 1, a second image data stream 202 from the second image capture device 106, a third image stream data 204 from the third image capture device 108, and a fourth image data stream 206 from the fourth image capture device 110. The image data streams 200, 202, 204, 206 can be stored in a database 208. In some examples, the 3D model generator 136 includes the database 208. In other examples, the database 208 is located external to the 3D model generator 136 in a location accessible to the 3D model generator 136 as shown in FIG. 2. The example database 208 of the illustrated example of FIG. 2 is implemented by any memory, storage device and/or storage disc for storing data such as, for example, flash memory, magnetic media, optical media, etc. Furthermore, the data stored in the example database 208 may be in any data format such as, for example, binary data, comma delimited data, tab delimited data, structured query language (SQL) structures, image data, etc.

The example 3D model generator 136 of FIG. 2 includes an image capture device controller 210. In this example, the image capture device controller 210 provides means for controlling operation of the image capture devices 104, 106, 108, 110. For example, the image capture device controller 210 can control power states of the image capture devices 104, 106, 108, 110 and/or settings for the image capture devices 104, 106, 108, 110 such as frame rates, zoom levels, position (e.g., for movable cameras), clock synchronization between two or more image capture devices 104, 106, 108, 110, etc. The image capture device controller 210 can control the image capture devices 104, 106, 108, 110 based on one or more image capture device rule(s) 212 defined by user input(s) and stored in the database 208.

The example 3D model generator 136 of FIG. 2 includes an image synchronizer 214. In the illustrated example, the image synchronizer 214 provides means for extracting images (e.g., video frames, still images) from the image data streams 200, 202, 204, 206 generated by each of the image capture devices 104, 106, 108, 110 and synchronizing the images captured by each device 104, 106, 108, 110 based on time (e.g., to provide a synchronized set of images for analysis). For example, the image synchronizer 214 can synchronize or align the images in the respective image data streams 200, 202, 204, 206 frame-by-frame based on time stamps associated with the images generated by each image capture device 104, 106, 108, 110.

Figure 3:
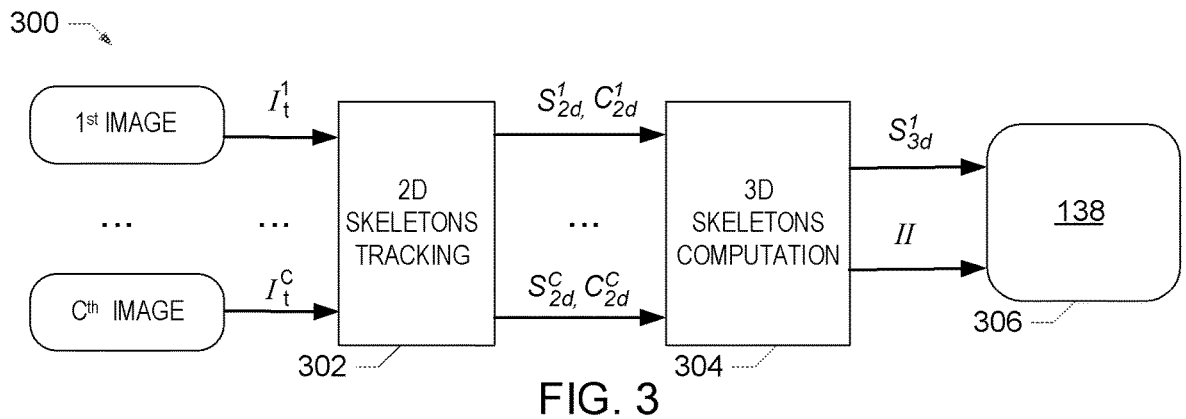
FIGS. 3-5 are flow diagrams illustrating example algorithms that are implemented by the example 3D model generator of FIG. 1.
Figure 4:
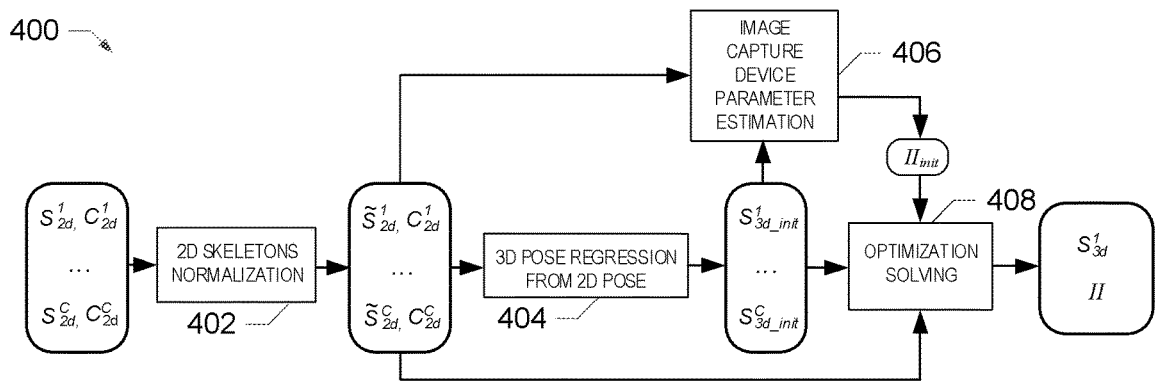
Figure 5:
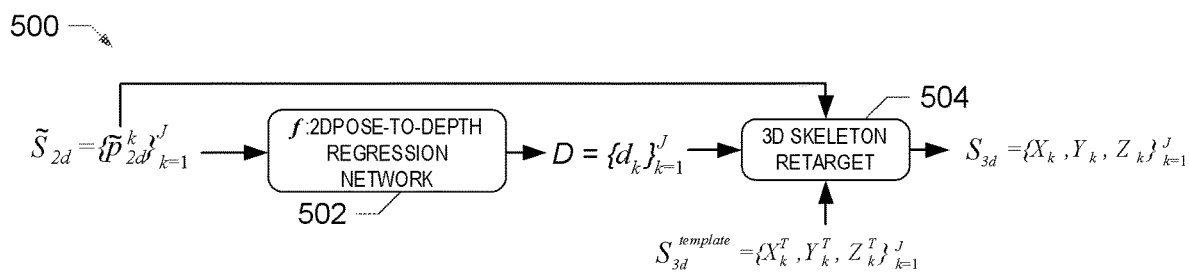

In the example of FIG. 2, the images extracted and time-synchronized by the image synchronizer 214 are used by the 3D model generator 136 to detect (e.g., predict) 2D pose(s) of the subject(s) in the image data and to generate 3D graphical model(s) of the subject(s) in the pose(s). The example 3D model generator 136 includes a 2D pose detector 216 and a 3D pose calculator 218. For illustrative purposes, the 2D pose detector 216 and the 3D pose calculator 218 will be discussed in connection with flow diagrams 300, 400, 500 shown in FIGS. 3-5 and the example models shown in FIGS. 6-11. The flow diagrams 300, 400, 500 of FIGS. 3-5 represent example algorithms that may be executed by the 2D pose detector 216 and/or the 3D pose calculator 218 to predict the pose(s) of the subject(s) in the image data and to generate the 3D graphical model(s). The models of FIGS. 6-11 illustrate example 2D and/or 3D model(s) that are generated by the 3D model generator 136 of FIG. 2 when performing the 3D pose estimation.

The flow diagram 300 of FIG. 3 illustrates an overview of the algorithms executed by the 2D pose detector 216 and/or the 3D pose calculator 218 to perform 3D pose estimation. As shown in FIG. 3, the 2D pose detector 218 of FIG. 2 receives synchronized images $I_t^1, \ldots, I_t^C$ (e.g., video frames) from C uncalibrated image capture devices 104, 106, 108, 110. The 2D pose detector 216 of FIG. 2 analyzes the synchronized images and predicts positions of keypoints (e.g., joints such as elbow, wrist, knee, etc.) of each subject in the respective synchronized images. The 2D pose detector 216 generates 2D skeleton data for each subject in the images based on the prediction of the position of the subject's keypoints and assigns confidence scores to the predicted positions of the keypoints (block 302). The 2D skeleton data and associated confidence scores $\{S_{2d}^1, C_{2d}^1, \ldots, S_{2d}^C, C_{2d}^C\}$ are used by the 3D pose calculator 218 to generate 3D graphical model(s) (e.g., skeletons) $S_{3d}^j$ of the subject(s) and to estimate parameters Π of the image capture devices 104, 106, 108, 110 that generate the image data 200, 202, 204, 206 from which the 3D skeleton data are derived (block 304). As disclosed herein, the 3D skeleton data $S_{3d}^i$ of the subject(s) and parameters Π of the image capture devices 104, 106, 108, 110 can be provided to, for example, the user application(s) 138 installed on the user device 132 (FIG. 1) for presentation and/or analysis (block 306).

Each of blocks 302 and 304 of the flow diagram 300 of FIG. 3 will now be discussed in more detail in connection with the example system 100 of FIG. 2. As noted above at block 302 of FIG. 3, the 2D pose detector 216 analyzes each synchronized image to identify the positions of keypoints or joints of each subject in the image data. In the examples disclosed herein, machine learning is used to improve efficiency of the 2D pose detector 216 in detecting keypoints of the respective subjects in the images.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, deep neural network models are used. In general, machine learning models/architectures that are suitable to use in the example approaches disclosed herein will be based on supervised learning. However, other types of machine learning models could additionally or alternatively be used such as, for example, unsupervised learning.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using training algorithms such as a stochastic gradient descent. However, any other training algorithm may additionally or alternatively be used. In examples disclosed herein, training can be performed based on early stopping principles in which training continues until the model(s) stop improving. In examples disclosed herein, training can be performed remotely or locally. In some examples, training may initially be performed remotely. Further training (e.g., retraining) may be performed locally based on data generated as a result of execution of the models. Training is performed using hyperparameters that control how the learning is performed (e.g., a learning rate, a number of layers to be used in the machine learning model, etc.). In examples disclosed herein, hyperparameters include batch size, iterations, epoch number, optimizer, learning rate, etc. Such hyperparameters are selected by, for example, trial and error based on the specific training dataset.

Training is performed using training data. In examples disclosed herein, the training data originates from previously generated 2D and/or 3D images that include subject(s) in different pose(s). Because supervised training is used, the training data is labeled. In example disclosed herein, labeling is applied to training data based on, for example, the location of keypoints of subject(s) in the image data. In some examples, the training data is sub-divided such that a portion of the data is used for validation purposes.

Once training is complete, the model(s) are stored in one or more databases (e.g., databases 236, 260 of FIG. 2). One or more of the models may then be executed by, for example, the 2D pose detector 216 and/or the 3D pose calculator 218 as disclosed below.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

Referring to FIG. 2, the example system 100 includes a first computing system 220 to train a neural network to detect positions of keypoints of a subject in image data. The example first computing system 220 includes a first neural network processor 222. In examples disclosed herein, the first neural network processor 222 implements a first neural network.

The example first computing system 220 of FIG. 2 includes a first neural network trainer 226. The example first neural network trainer 226 of FIG. 2 performs training of the neural network implemented by the first neural network processor 222. In some examples disclosed herein, training is performed using a stochastic gradient descent algorithm. However, other approaches to training a neural network may additionally or alternatively be used.

The example first computing system 220 of FIG. 2 includes a first training controller 228. The example training controller 228 instructs the first neural network trainer 226 to perform training of the neural network based on first training data 230. In the example of FIG. 2, the first training data 230 used by the first neural network trainer 226 to train the neural network is stored in a database 232. The example database 232 of the illustrated example of FIG. 2 is implemented by any memory, storage device and/or storage disc for storing data such as, for example, flash memory, magnetic media, optical media, etc. Furthermore, the data stored in the example database 232 may be in any data format such as, for example, binary data, comma delimited data, tab delimited data, structured query language (SQL) structures, image data, etc. While in the illustrated example, the database 232 is illustrated as a single element, the database 232 and/or any other data storage elements described herein may be implemented by any number and/or type(s) of memories.

In the example of FIG. 2, the training data 230 can include images including subject(s) in various pose(s) generated for purposes of training. In some examples, the training data includes the image data streams 200, 202, 204, 206 generated by the image capture devices(s) 104, 106, 108, 110. The training data 230 is labeled with (X, Y) joint or keypoint positions for each relevant keypoint (e.g., joint) of the subject(s) in each pose relative to a coordinate system for each image in the training data. The first neural network trainer 226 trains the neural network implemented by the neural network processor 222 using the training data 230. Based on the positions of the keypoints for subject(s) performing different poses in the training data 230, the first neural network trainer 226 trains the neural network 222 to identify (e.g., predict) the positions of the keypoints of the respective subjects in the synchronized images $I_t^1, \ldots, I_t^C$ (e.g., the images 114, 116, 118, 120) generated by the image capture devices 104, 106, 108, 110.

A keypoint prediction model 234 is generated as a result of the neural network training. The keypoint prediction model 234 is stored in a database 236. The databases 232, 236 may be the same storage device or different storage devices.

The keypoint prediction model 234 is executed by the 2D pose detector 216 of the 3D model generator 136 of FIG. 2. In particular, the 2D pose detector 216 executes the keypoint prediction model 234 for each synchronized image $I_t^1, \ldots, I_t^C$ (e.g., the images 114, 116, 118, 120 of FIG. 1) to detect the positions (e.g., (X, Y) coordinate positions) of the keypoints of the subject(s) in the images and to generate 2D skeleton(s) $S_{2d} = \{p_{2d}^k\}_{k=1}^J$ (e.g., where k is an index identifying a particular keypoint of the subject 102 up to a total number of J keypoints, and p represents the (X, Y) coordinate position for the corresponding keypoint) of the subject(s) for each image. In some examples, the 2D pose detector 216 applies a filter (e.g., a low pass filter such as a "one Euro" filter) to the 2D skeleton data $S_{2d}$ to remove noise and smooth the data. The 2D skeleton data $S_{2d}$ is stored in the database 208 as 2D skeleton data 240 as for example, matrix or vector data. In some examples, the 2D skeleton data 240 is used as the first training data 230 for training the neural network 222.

Figure 6:
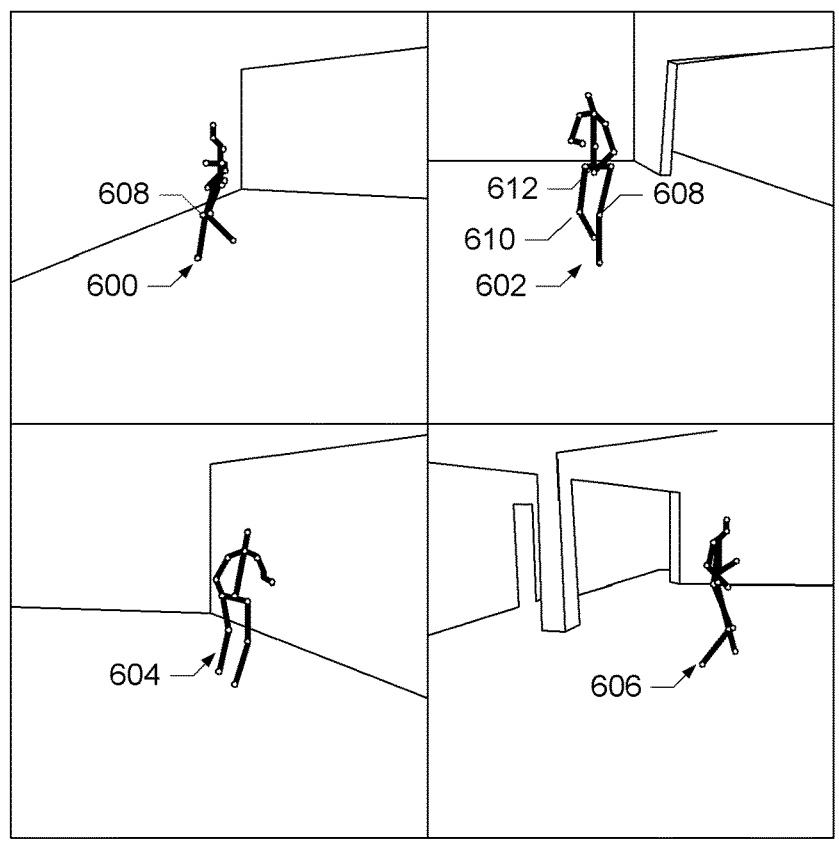
FIG. 6 illustrates example two-dimensional (2D) graphical model data generated in accordance with teachings of this disclosure.

The (X Y) coordinates of the 2D skeleton data 240 (i.e., $S_{2d}^i$) can be plotted to generate 2D graphical model(s). FIG. 6 illustrates graphical 2D skeletons based on the 2D skeleton data $S_{2d}^i$ generated by the 2D pose detector 216 for each synchronized image 114, 116, 118, 120 of FIG. 1. In particular, FIG. 6 illustrates a first graphical 2D skeleton 600 of the subject 102 based on the 2D skeleton data $S_{2d}^i$ for the first image 114 of FIG. 1, a second graphical 2D skeleton 602 of the subject 102 based on the 2D skeleton data $S_{2d}^i$ for the second image 116, a third graphical 2D skeleton 604 of the subject 102 based on the 2D skeleton data $S_{2d}^i$ for the third image 118, and a fourth graphical 2D skeleton 606 of the subject 102 based on the 2D skeleton data $S_{2d}^i$ for the fourth image 120. As mentioned above, the 2D skeleton data (e.g., matrices and/or vector(s)) used to generate the 2D graphical models 600, 602, 604, 606 of FIG. 6 can be stored in the database 208 of FIG. 2 as the 2D skeleton data 240. Additionally or alternatively, in some examples, the graphical images 600, 602, 604, 606 generated from the 2D skeleton data 240 are stored in the database 208.

Each 2D skeleton model 600, 602, 604, 606 of FIG. 6 is defined by the keypoints of the subject 102 that are identified by the 2D pose detector 216 in a respective image 114, 116, 118, 120 using the keypoint prediction model 134. For example, the first graphical 2D skeleton 600 includes a first keypoint 608 at a first (X, Y) position in the coordinate system of the first image capture device 104. The first keypoint 608 corresponds to a first knee of the subject 102 viewable in the first image 114 of FIG. 1. The second graphical 2D skeleton 602 includes the first keypoint 608 at a first (X, Y) position and a second keypoint 610 at second (X, Y) position in the coordinate system of the second image capture device 108. The second keypoint 610 corresponds to a second knee of the subject 102 viewable in the second image 116 of FIG. 1.

In examples disclosed herein, a pelvis joint labeled as keypoint 612 in the second graphical 2D skeleton 602 and the third graphical 2D skeleton 604 of FIG. 6 serves as a root joint, or reference joint, for the 3D pose estimation. As disclosed herein, the 3D position of other keypoints of the subject can be identified relative to the pelvis joint of the subject.

Returning to FIG. 2, the 2D pose detector 216 of FIG. 2 calculates a confidence score for each keypoint identified in a respective image 114, 116, 118, 120 that is used to generate the 2D skeleton data 240 for the image (e.g., as represented by the graphical 2D skeletons 600, 602, 604, 606 of FIG. 6). For the 2D skeleton data $S_{2d}$ associated with a particular view of an image capture device, the 2D pose detector 216 generates a confidence score vector $C_{2d} = \{C_{2d}^k\}_{k=1}^J$ with each score $C_{2d}^k$ representing a detection credibility of the joint coordinate $p_{2d}^k$ of the 2D skeleton data $S_{2d} = \{p_{2d}^k\}_{k=1}^J$. The confidence score represents a confidence with which the 2D pose detector 216 identified a position of a particular keypoint of the subject in the image. For example, the 2D pose detector 216 may assign a lower confidence score $C_{2d}^k$ to keypoints in the image that are occluded and a higher confidence score $C_{2d}^k$ to keypoints that are not occluded in the image, where the higher confidence score indicates greater confidence that the particular location estimated for a keypoint is accurate. A keypoint may be occluded or at least partially occluded in an image if, for example, the keypoint is not substantially visible in the image due to the field of view of the image capture device that generated the image and/or because the joint is covered by, for instance, the subject's clothing.

In examples in which more than one subject is identified in an image, the 2D pose detector 216 implements tracking algorithm(s) 242 to assign an identifier to each subject identified in the image and subsequent images associated with a particular image data stream 200, 202, 204, 206. For instance, the tracking algorithm(s) 242 can identify different subjects using bounding boxes. In such examples, a position of each subject in the images of a respective image data stream 200, 202, 204, 206 can be tracked using the unique bounding boxes assigned to each subject. The tracking algorithm(s) 242 can use other types of identifiers to track two or more subjects in image data. The tracking algorithm(s) 242 can be defined by user input(s) and stored in the database 208.

As disclosed herein, the 2D skeleton data and associated confidence scores $\{S_{2d}^1, C_{2d}^1, \ldots, S_{2d}^C, C_{2d}^C\}$ generated by the 2D pose detector 216 are provided to the 3D pose calculator 218 for use in generating the 3D graphical model(s) of the subject(s) in the image data. The flow diagram 400 of FIG. 4 shows an example algorithm that can be implemented by the 3D pose calculator 218 of FIG. 2 to generate the 3D graphical model(s) based on the 2D skeleton data 240 generated by the 2D pose detector 216. In particular, the 3D pose calculator 218 normalizes each input 2D skeleton data $S_{2d}^i=\{p_{2d\_i}^k\}_{k=1}^J$ to generate normalized 2D skeleton data $\tilde{S}_{2d}^i=\{\tilde{p}_{2d\_i}^k\}_{k=1}^J$ (block 402). The 3D pose detector 218 normalizes the 2D skeleton data such that the graphical representations of the 2D skeleton data for a set of synchronized images (e.g., the 2D skeleton models 600, 602, 604, 606 of FIG. 6) have a similar size, are substantially aligned relative to a reference plane, etc. For example, the 3D pose detector 218 can execute the following equation to normalize the 2D skeleton data and obtain normalized 2D joint coordinates $\tilde{p}_{2d\_i}^k$:

$$\tilde{p}_{2d\_i}^k = (p_{2d\_i}^k - p_{2d\_i}^0) * \left(\frac{1}{\lambda}\right). \quad \text{(Eq. 1)}$$

In Equation 1, the variable $\lambda$ is a scale factor to account for distances between, for instance, a root joint (e.g., a pelvis joint) of the subject and other joints of the subject. The scale factor $\lambda$ can be defined based on reference data defining distances between the pelvis joint (e.g., the root joint) and other joints. The normalized 2D skeleton data is stored in the database 208 as normalized 2D skeleton data 244 as for example, matrix or vector data.

Figure 7:
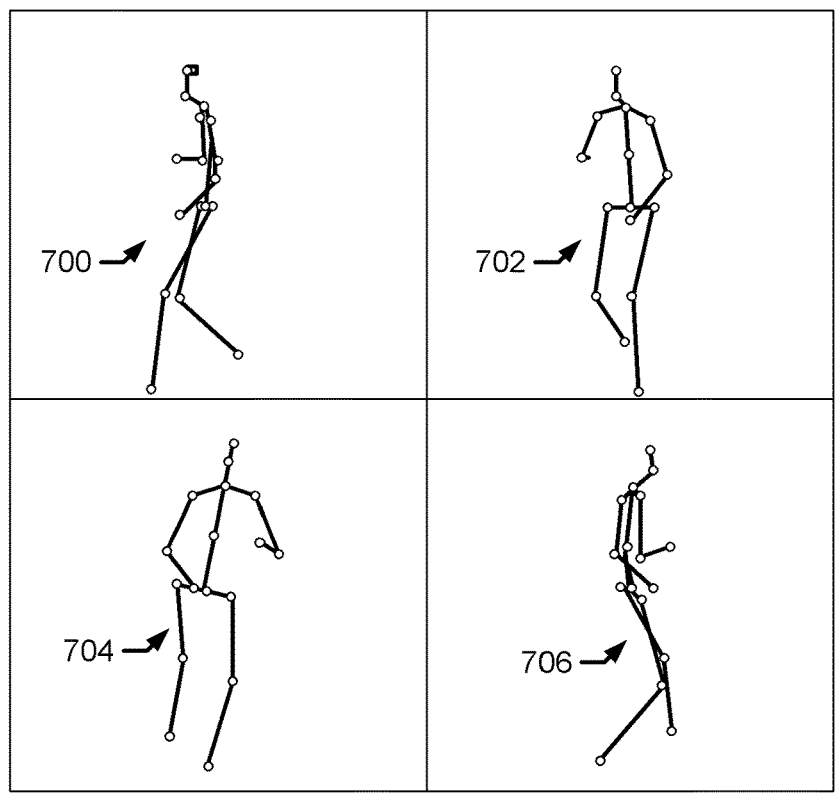
FIG. 7 illustrates example normalized 2D graphical model data generated in accordance with teachings of this disclosure.

FIG. 7 illustrates example graphical representations of the normalized 2D skeleton data 244 (i.e., $\tilde{S}_{2d}^i$) generated by the 3D pose calculator 218 of FIG. 2 based on the 2D skeleton data 240 (e.g., as graphical represented by the models 600, 602, 604, 606 of FIG. 6). The 3D pose calculator 218 generates a first graphical normalized 2D skeleton 700 of the subject 102 based on the normalized 2D skeleton data $\tilde{S}_{2d}^i$ derived from the 2D skeleton data $S_{2d}$ that is represented by the first graphical 2D skeleton 600 of FIG. 6, a second graphical normalized 2D skeleton 702 of the subject 102 based on the normalized 2D skeleton data $\tilde{S}_{2d}^i$ derived from the 2D skeleton data $S_{2d}$ that is represented by the second graphical 2D skeleton 602 of FIG. 6, a third graphical normalized 2D skeleton 704 of the subject 102 based on the normalized 2D skeleton data $\tilde{S}_{2d}^i$ derived from the 2D skeleton data $S_{2d}$ that is represented by the third graphical 2D skeleton 606 of FIG. 6, and a fourth graphical normalized 2D skeleton 706 of the subject 102 based on the normalized 2D skeleton data $\tilde{S}_{2d}^i$ derived from the 2D skeleton data $S_{2d}$ that is represented by the fourth graphical 2D skeleton 606 of FIG. 6. As compared to the graphical 2D skeletons 600, 602, 604, 606 of FIG. 6 representing the non-normalized 2D skeleton data, the models 700, 702, 704, 706 of FIG. 7 representing the normalized 2D skeleton data are substantially similar in size as compared to the models 600, 602, 604, 606 of FIG. 6. As mentioned above, the normalized 2D skeleton data (e.g., matrices and/or vector(s)) used to generate the normalized 2D graphical models 700, 702, 704, 706 of FIG. 7 can be stored in the database 208 of FIG. 2 as the normalized 2D skeleton data 244. Additionally or alternatively, in some examples, the graphical images 700, 702, 704, 706 generated from the normalized 2D skeleton data 244 are stored in the database 208.

In the examples of FIGS. 2-4, the normalized 2D skeleton data 244 is used to train a general regression neural network, which generates a 3D pose prediction model that is used by the 3D pose calculator 218 to transform the 2D skeleton data into 3D graphical model(s) or skeleton(s) (e.g., block 404 of FIG. 4).

Referring again to FIG. 2, the example system 100 includes a second computing system 246 to train a neural network to map the 2D positions (e.g., (X, Y) coordinates) of the joints or keypoints of the subject to 3D positions (e.g., (X, Y, Z) coordinates). The example second computing system 246 includes a second neural network processor 248. In examples disclosed herein, the second neural network processor 248 implements a second neural network.

The example second computing system 246 of FIG. 2 includes a second neural network trainer 250. The example second neural network trainer 250 of FIG. 2 performs training of the neural network implemented by the second neural network processor 248. In some examples disclosed herein, training is performed using a stochastic gradient descent algorithm. However, other approaches to training a neural network may additionally or alternatively be used.

The example second computing system 246 of FIG. 2 includes a second training controller 252. The example second training controller 252 instructs the second neural network trainer 250 to perform training of the neural network based on second training data 254. In the example of FIG. 2, the second training data 254 used by the second neural network trainer 248 to train the neural network is stored in a database 256. The example database 256 of the illustrated example of FIG. 2 is implemented by any memory, storage device and/or storage disc for storing data such as, for example, flash memory, magnetic media, optical media, etc. Furthermore, the data stored in the example database 256 may be in any data format such as, for example, binary data, comma delimited data, tab delimited data, structured query language (SQL) structures, image data, etc. While in the illustrated example, the database 256 is illustrated as a single element, the database 256 and/or any other data storage elements described herein may be implemented by any number and/or type(s) of memories.

In the example of FIG. 2, the training data 254 includes previously generated 3D human pose datasets. The 3D human pose datasets are labeled with (X, Y, Z) joint positions relative to a 3D coordinate system for each image in the training data 254. For example, a pelvis-centered 3D skeleton data in the 3D human pose datasets can define the pelvis joint at the coordinates (0, 0, 0), where coordinates for the other joints (e.g., the elbow, the wrist) are offset relative to the pelvis joint.

In the example of FIG. 2, for each pelvis-centered 3D skeleton data $\{X_j, Y_j, Z_j\}_{j=1}^J$ in the training data 254, the training controller 252 determines corresponding 2D skeleton data $\{X_j, Y_j\}_{j=1}^J$ (e.g., via orthographic projection). The training controller 252 normalizes the 2D skeleton data generated from the 3D human pose datasets to determine a scale value $$\frac{1}{\lambda}.$$

As a result, a training data pair of $$\left\{\frac{1}{\lambda}X_j, \frac{1}{\lambda}Y_j\right\}_{j=1}^J \text{ and } \left\{\frac{1}{\lambda}Z_j\right\}_{j=1}^J$$

is generated for supervised learning of the neural network 248. The training controller 248 can rotate the 3D skeleton data (e.g., by a random elevation angle and/or a random azimuth angle) to generate additional training data.

The second neural network trainer 250 trains the neural network 248 to recognize respective depth offsets between the pelvis joint (i.e., the root joint) and other joints, where the depth offset represents an offset in a depth direction (the Z direction) with respect to a coordinate system of each image capture device. A joint depth offset map $D=\{d_k\}_{k=1}^J$ is generated as a result of the training, where $d_k$ indicates the depth offset from the $k^{th}$ joint to the pelvis joint. The joint depth offset model 258 (i.e., the depth offset map $D=\{d_k\}_{k=1}^J$) is stored in a database 260. The databases 256, 260 may be the same storage device or different storage devices.

The example 3D pose calculator 218 of FIG. 2 uses the neural-network trained joint depth offset model 258 to predict 3D joint coordinates for the keypoints and to generate an initial set of 3D graphical model(s) or skeleton(s) based on the predicted 3D joint coordinates. The flow diagram 500 of FIG. 5 illustrates the 3D pose regression from the normalized 2D skeleton data. As shown in FIG. 5, the joint depth offset model $D=\{d_k\}_{k=1}^J$ is generated as a result of training of the neural network 248 (block 502). The 3D pose calculator 218 uses the normalized 2D skeleton data $\tilde{S}_{2d}$ and the joint depth offset model D to generate predicted scaled 3D skeleton data $$S_{3d}^{pred} = \{\tilde{p}_{2d}^k, d_k\}_{k=1}^J$$

(e.g., via orthographic projection). A predicted 3D skeleton is generated for each image capture device view, which is used to generate a final 3D skeleton in the world coordinate system defined by one of the image capture device views.

The 3D pose calculator 218 performs a retargeting operation using a pre-defined 3D skeleton template $S_{3d}^{template}=\{X_k^T, Y_k^T, Z_k^T\}_{k=1}^J$ (block 504). The pre-defined 3D skeleton template $S_{3d}^{template}$ includes reference bone lengths (e.g., average bone lengths). The 3D skeleton template can be defined by user input(s) and stored in the database 208 of FIG. 2 as skeleton template data 263. In particular, the 3D pose calculator 218 causes the predicted 3D skeleton data $$S_{3d}^{pred} = \{\tilde{p}_{2d}^k, d_k\}_{k=1}^J$$

to be retargeted to $S_{3d}=\{X_k, Y_k, Z_k\}_{k=1}^J$, such that $S_{3d}$ has the same bone lengths as the 3D skeleton template $S_{3d}^{template}$ and the same bone directions of the predicted 3D skeleton data $S_{3d}^{pred}$ generated from the image data captured by the image capture devices 104, 106, 108, 110.

As a result of the regression analysis to obtain the 3D joint coordinates from the normalized 2D skeleton data and the joint depth offset model 258, the 3D pose calculator 218 creates initial 3D skeleton data $S_{3d\_init}^i \ldots S_{3d\_init}^c$ for each image in the synchronized set of images. The initial 3D skeleton data $S_{3d\_init}^i \ldots S_{3d\_init}^c$ represents a result of the regression analysis from the 2D skeleton data $S_{2d}^i$ corresponding to a respective view of the image capture devices 104, 106, 108, 110. The initial 3D skeleton data $S_{3d\_init}^i \ldots S_{3d\_init}^c$ is stored as initial 3D skeleton data 265 in the database 208 (e.g., as matrix or vector data).

Figure 8:
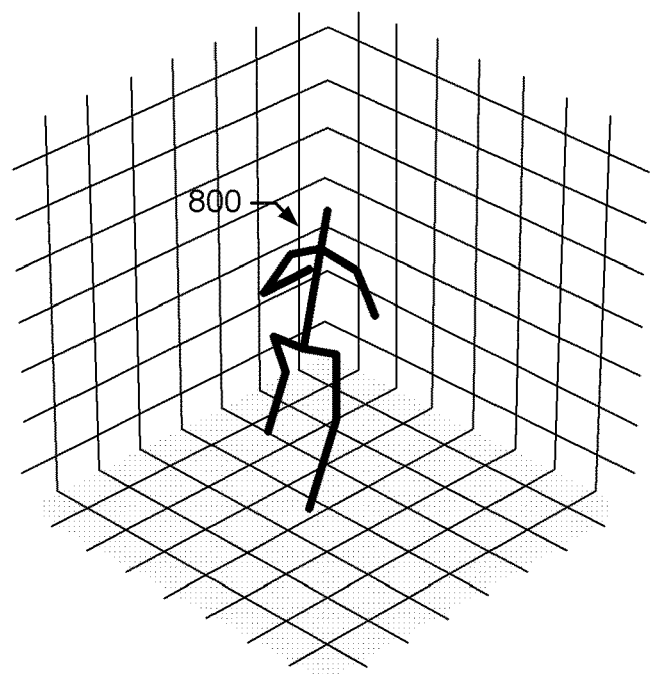
FIG. 8 illustrates an example 3D graphical model generated in accordance with teachings of this disclosure.

FIG. 8 illustrates an example graphical model 800 of the initial 3D skeleton data 265 (i.e., $S_{3d\_init}^i$) that results from the execution of the general regression neural network (e.g., as disclosed in connection with FIG. 5) to regress the 3D pose of the subject 102 of FIG. 1 from the normalized 2D skeleton data SL graphically represented by the first skeleton 700 of FIG. 7 associated with the view of the first image capture device 104 (e.g., $S_{3d\_init}^i$, where i=1). The example 3D skeleton model 800 of FIG. 8 is shown in the coordinate system of the first image capture device 104. In some examples, the 3D pose calculator 218 generates graphical representations of the initial 3D skeleton data for the 2D skeleton data SL associated with each of the image capture device views (e.g., a second graphical 3D representation associated with the normalized 2D skeleton data that is used to generate the second graphical normalized 2D skeleton 702 of FIG. 7). In some examples, each graphical 3D model created using the initial 3D skeleton data for a particular view shows the same or substantially the same pose, but is rotated in light of the view angle associated with respective image capture device that captured the view. As mentioned above, the initial 3D skeleton data (e.g., matrices and/or vector(s)) used to generate the graphical model 800 can be stored in the database 208 of FIG. 2 as the initial 3D skeleton data 265. Additionally or alternatively, in some examples, the graphical image(s) 800 generated from the initial 3D skeleton data 265 are stored in the database 208.

As disclosed herein, the image capture devices 104, 106, 108, 110 are uncalibrated and, thus, one or more intrinsic and/or extrinsic parameters of the image capture devices 104, 106, 108, 110 are unknown to the 3D model generator 136 and/or change during generation of the image data. Thus, in some examples, the initial 3D skeleton data 265, 800 may not completely represent the view angle associated with the corresponding image capture devices 104, 106, 108, 110. The example 3D model generator 136 of FIG. 2 includes an image capture device parameter anlayzer 264. The image capture device parameter analyzer 264 provides means for predicting intrinsic and extrinsic parameters of the image capture devices 104, 106, 108, 110 such as orientation and position of the second, third, and fourth image capture devices 106, 108, 110 relative to the world coordinate system defined by the coordinate system of the first image capture device 104. The example 3D model generator 136 of FIG. 2 uses the predicted parameters of the image capture devices 104, 106, 108, 110 to optimize the 3D skeleton data such that a final 3D skeleton accounts for the multiple views of the subject captured in the image data generated by each device 104, 106, 108, 110.

In examples disclosed herein, the image capture device parameters can be represented by the variable $\Pi=\{R_{1i}, T_i, s_i\}_{i=1}^C$. For each image capture device 104, 106, 108, 110, there are six parameters. In particular, $R_{1i} \in \mathbb{R}^3$ represents the Euler angles denoting rotation between the first image capture device 104 and the $i^{th}$ image capture device 106, 108, 110. $R_{1i}$ is a 3D vector that can be converted to a 3D rotation matrix M with 3×3 elements, $T_i \in \mathbb{R}^2$ (e.g., T=(Tx, Ty)) is a 2D vector denoting translation in an image plane, and $s_i$ is a 1D scalar value representing scale. In examples disclosed herein, the variables $T_i$, $s_i$ in $\Pi=\{R_{1i}, T_i, s_i\}_{i=1}^{C}$ represent intrinsic parameters of the image capture devices and $R_{1i}$ represents extrinsic parameters of the image capture devices. For example, for a given 3D joint position $J_3=(X, Y, Z)$ in the coordinate space of the first image capture device 104, a projection of the 3D joint position $J_3$ onto the $i^{th}$ camera image plane (e.g., the image plane of the second image capture device 106) can be represented as $\bar{X}=\Pi_i(X)=s_i\cdot(X'_{xy})+T_i$, where $X'=R_{1i}(X)$ denotes the new point after X is rotated by $R_{1i}$, and $X'_{xy}$ represents the x, y coordinates of X'.

The example image capture device parameter analyzer 264 of FIG. 2 determines initial values $R_{1i}$, $T_i$, $s_i$ for the image capture devices based on the normalized 2D skeleton data 244 and the initial 3D skeleton data 265 (e.g., as shown at block 406 of the flow diagram 400 of FIG. 4). For example, the image capture device parameter analyzer 264 of FIG. 2 uses the regressed initial 3D skeleton data $S_{3d\_init}^{1}=\{p_{3d\_1}^{k}\}_{k=1}^{J}$ and $S_{3d\_init}^{i}=\{p_{3d\_i}^{k}\}_{k=1}^{J}$ to compute the initial estimation of $R_{1i}$. The image capture device parameter analyzer 264 determines an optimal $R_{1i}$ by minimizing the function: $\Sigma_{k=1}^{J}\|R_{1i}(p_{3d\_1}^{k})-p_{3d\_i}^{k}\|_2$, where the minimization can be performed using, for example, Singular Value Decomposition (SVD). In some examples, only coordinates corresponding to torso joints (e.g., hips, shoulders) of the subject are used for the minimization.

The image capture device parameter analyzer 264 of FIG. 2 uses the initial 3D skeleton data $S_{3d\_init}^{i}=\{p_{3d\_i}^{k}\}_{k=1}^{J}$ and the normalized 2D skeleton data $\tilde{S}_{2d}^{i}=\{\tilde{p}_{2d\_i}^{k}\}_{k=1}^{J}$ to determine an initial estimate of the scalar value $s_i$. In some examples, the image capture device parameter analyzer 264 determines the optimal $s_i$ by minimizing the function:

$$\Sigma_{k=1}^{J}\|s_i\cdot(p_{3d\_i}^{k})_{xy}-\tilde{p}_{2d\_i}^{k}\|_2.$$

In some examples, the image capture device parameter analyzer 264 sets the initial estimation of the translation variable $T_i$, to be a zero vector. The initial parameters $R_{1i}$, $T_i$, $s_i$ are stored in the database 208 of FIG. 2 as image capture device parameter data 266.

The example 3D pose calculator 218 of FIG. 2 uses the initial 3D skeleton data 265 and the initial image capture device parameter data 266 to perform an optimization that results in estimation of the 3D pose of the subject (e.g., the subject 102 of FIG. 1) and generation of a (e.g., final) 3D graphical model of the subject in the pose (e.g., as shown at block 408 of the flow diagram 400 of FIG. 4). As a result of the optimization, the 3D pose calculator 218 generates a 3D skeleton $S_{3d}^{i}$ (e.g., a graphical model) corresponding to the view of the $i^{th}$ image capture device. For instance, the 3D skeleton $S_{3d}^{i}$ can be generated with respect to the view of the first image capture device 104 of FIG. 1 serving as the world coordinate system. The optimization performed by the 3D pose calculator 218 serves to combine or fuse the initial 3D skeletons 265, 800 generated for each view associated with an image capture device to achieve a more accurate, final 3D skeleton.

Figure 9:
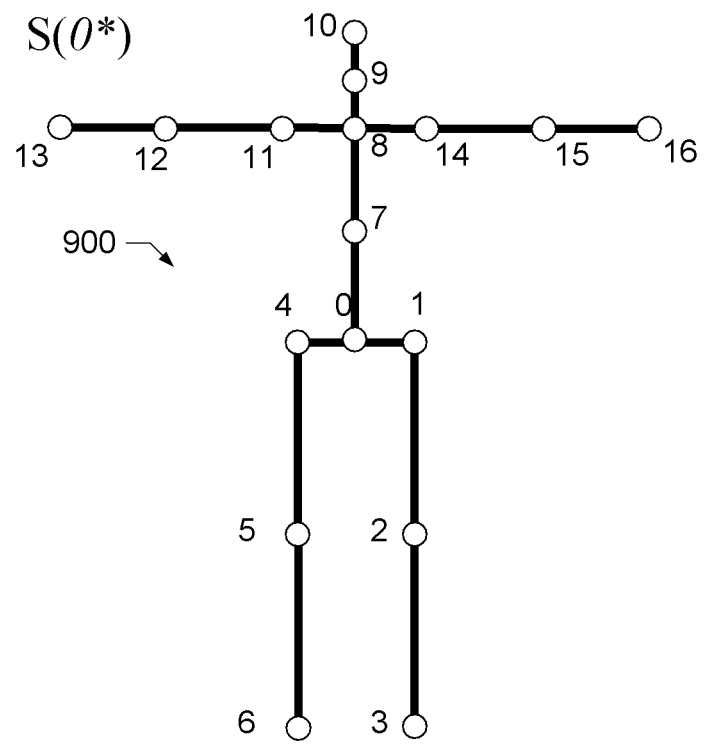
FIGS. 9 and 10 illustrate example reference body data that may be used to generate 3D graphical models in accordance with teachings of this disclosure.

The 3D pose calculator 218 of FIG. 2 uses a 3D skeleton template $S_{3d}^{*}$ (e.g., the $S_{3d}^{template}=\{X_k^T, Y_k^T, Z_k^T\}_{k=1}^{J}$) to perform the optimization. FIG. 9 shows a graphical representation of an example 3D skeleton template 900 or kinematic tree, wherein the skeleton is shown in a rest-pose as defined by the position of 17 labeled keypoints or joints in FIG. 9. The joints define nodes in the kinematic tree. As shown in FIG. 9, the 3D skeleton template 900 can be defined for an individual with, for instance, a body height of 170 centimeters. Corresponding bone lengths for the 3D skeleton template 900 can be generated based on average anthropometry statistics. However, if a height of a subject of interest (e.g., the subject 102) is known, the 3D skeleton template 900 can be adjusted based on the known body metrics. The 3D skeleton template 900 is defined by user inputs and stored in the database 208 of FIG. 2 as the skeleton template data 263. In some examples, the 3D skeleton template 900 is stored graphically (e.g., as the image data shown in FIG. 9) or a matrix and/or vector data.

Figure 10:
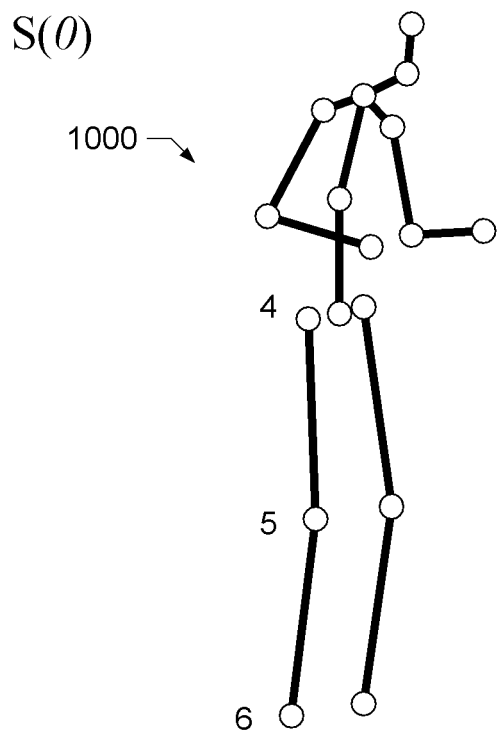

In examples disclosed herein, the 3D skeleton template 900 is used to represent a 3D skeleton for the subject of interest (e.g., the subject 102 of FIG. 1) using a set of skeletal joint rotation vectors θ instead of 3D joint coordinates. FIG. 10 shows a postured 3D skeleton 1000, where the joints of the 3D skeleton template 900 of FIG. 9 have been rotated by the skeletal joint rotation vectors θ to position the 3D skeleton into a pose. Put another way, new joint positions in FIG. 10 are calculated by rotating the original joint positions shown in FIG. 9. In examples disclosed herein, the skeletal joint rotation vectors θ are defined as optimized parameters when the 3D pose calculator 218 performs the optimization instead of 3D joint positions because the joint rotation vectors θ account for motion distribution independent of variant bone lengths.

In the example of FIG. 10, the skeletal joint rotation vectors θ can be defined as:

$$\theta = \{\vec{\omega}_{0_b}, \vec{\omega}_4, \vec{\omega}_5, \vec{\omega}_1, \vec{\omega}_2, \vec{\omega}_{0_t}, \vec{\omega}_7, \vec{\omega}_{8_t}, \vec{\omega}_9, \vec{\omega}_{8_r}, \vec{\omega}_{11}, \vec{\omega}_{12}, \vec{\omega}_{8_l}, \vec{\omega}_{14}, \vec{\omega}_{15}\}_{15 \times 3},$$

where $\vec{\omega}_k \in \mathbb{R}^3$ denotes an axis-angle representation of a relative rotation of a bone part k with respect to a parent of the particular bone part in the kinematic tree. For example, a skeletal joint rotation vector θ can define the rotation of the bone extending between joints 5 and 6 relative to the bone extending between joints 4 and 5 as labeled in FIGS. 9 and 10 (e.g., rotation at joint 5). In examples herein, the variable θ* can be defined as a zero vector such that S(θ*) is equivalent to the skeleton template $S_{3d}^{*}$ shown in FIG. 9.

The example 3D pose calculator 218 of FIG. 2 uses the initial 3D skeleton data $S_{3d\_init}^{i}$ (e.g., the initial 3D skeleton data 265) that is predicted based on the regression neural network to determine corresponding initial skeletal joint rotation vectors $\theta_{init}$ such that the bones directions $S(\theta_{init})$ of the 3D skeleton template $S_{3d}^{*}$ are substantially the same as the directions of bones in the initial 3D skeleton data $S_{3d\_init}^{i}$, wherein i in $S_{3d\_init}^{i}$ corresponds to the view of, for instance, the first image capture device 104 (i.e., i=1). In this example, the 3D pose calculator 218 uses the normalized 2D skeleton data $\{S_{2d}^{i}, C_{2d}^{i}\}_{i=1}^{C}$, the initial 3D skeleton data $\{S_{3d\_init}^{i}\}_{i=1}^{C}$, and the initial image capture device parameters $\Pi_{init}$, to solve for a final (e.g., optimal) 3D skeleton $S_{3d}^{1}$ and final (e.g., optimal) image capture device parameters Π for the view associated with the first image capture device 104 by reducing (e.g., minimizing) a non-linear least squares objective function. In particular, using the initial 3D pose parameters $\theta_{init}$ and the initial image capture device parameters $\Pi_{init}$, the 3D pose calculator 218 determines an optimal skeleton joint rotation vector θ and optimal image device capture parameters Π by minimizing the following objective function:

$$E(\theta,\Pi)=E_{joint}(\theta,\Pi)+E_{init}(\theta,\Pi)+w_1 * E_{prior}(\theta)+E_{temporal}(\theta,\Pi) \quad \text{(Eq. 2);}$$

$$E_{joint}(\theta,\Pi)=\Sigma_{i=1}^{C}\|C_{2d}^{i}\cdot(\Pi_i(S_{3d}(\theta))-\tilde{S}_{2d}^{i})\|_2 \quad \text{(Eq. 3);}$$

$$(E_{init}(\theta,\Pi)=w_2*\|\theta-\theta_{init}\|_2+w_3*\Sigma_{i=1}^{C}\|R_{1i}-R_{1i\_init}\|_2 \quad \text{(Eq. 4)};$$

$$E_{prior}(\theta)=-\log(G(\theta;\mu_\theta,\Sigma)) \quad \text{(Eq. 5)};$$

$$E_{temporal}(\theta,\Pi)=w_4*\|(S_{3d}(\theta))-S_{3d}(\theta^{t-1}))\|_2+w_5*\|\Pi-\Pi^{t-1}\|_2 \quad \text{(Eq. 6)}.$$

In the above equations, $E_{joint}$ defines a skeleton-view consistency for all views associated with the respective image capture devices 104, 106, 108, 110, and measures the distance between the projected joint locations and corresponding estimated joint locations; $E_{init}$ measures a difference between the optimized parameters and the initial parameters; $G(\theta; \mu_\theta, \Sigma)$ is a Gaussian function that defines a probability distribution of a reasonable pose as a known pose (e.g., as determined based on known 3D human pose data, such as the training data 254); $E_{prior}$ serves as a constraint to cause the optimization to favor probable poses over improbable poses (e.g., favoring poses where the subject's leg bends and the subject's foot moves backward rather than forward during bending of the leg); $E_{temporal}$ represents a change of parameters in the temporal domain; and $w_1$, $w_2$, $w_3$, $w_4$, $w_5$ are scalar weights that can be adjusted to tune the optimization. In performing the optimization, the 3D pose calculator 218 accounts for the confidence scores assigned to the predicted 2D keypoints positions by the 2D pose detector 216. For example, the optimized 3D skeleton is less dependent on the 2D joints with lower confidence scores than 2D joint(s) associated with higher confidence scores. Referring to FIG. 2, post-processing 3D skeleton data 270 generated as a result of the optimization can be stored in the database 208 and used, for instance, as training data 230, 254 for the neural networks.

Figure 11:
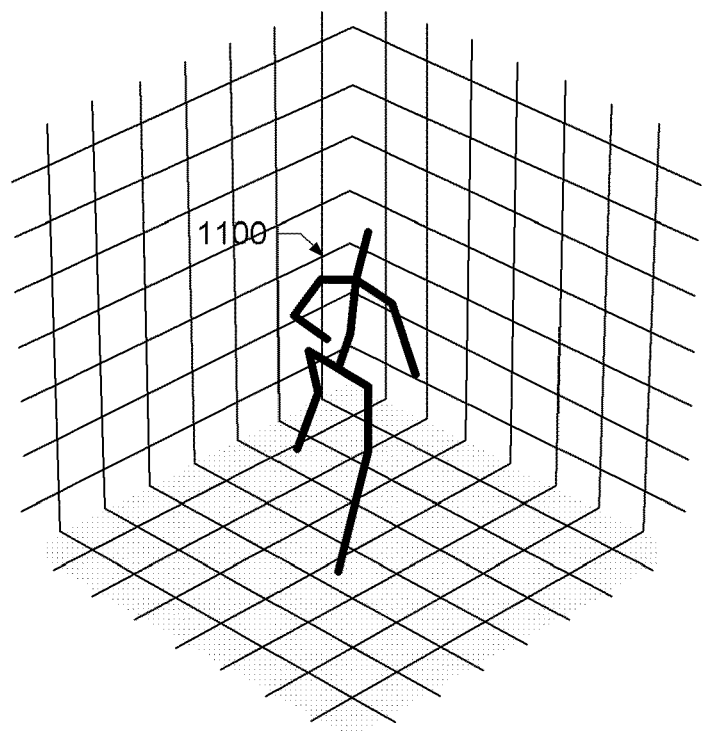
FIG. 11 illustrates another example 3D graphical model generated in accordance with teachings of this disclosure

FIG. 11 shows an example graphical model 1110 of a post-processing 3D skeleton generated as a result of an optimization performed by the 3D pose calculator 218 of FIG. 2 using the normalized 2D skeleton data 244 (e.g., as graphically represented by the models 700, 702, 704, 706 of FIG. 7), the initial 3D skeleton data 265 (e.g., where the initial 3D skeleton data associated with the view of the first image capture device 104 is graphically represented by the model 800 of FIG. 8), and the skeleton template $S_{3d}*$ graphically shown by the model 900 of FIG. 9. The example final (e.g., optimal) 3D graphical skeleton 1100 of FIG. 11 is shown in or projected onto the world coordinate system defined by the coordinate system of the first image capture device 104 (e.g., SL).

Examples disclosed herein are discussed in connection with the world coordinate system defined by the coordinate system of the first image capture device 104 such that the graphical model(s) of the post-processing 3D skeleton(s) are projected on to the world coordinate system defined by the first image capture device 104 as shown in FIG. 11. However, in other examples, the coordinate systems of the other image capture devices 106, 108, 110 can be selected as the world coordinate system. For instance, if the coordinate system of the second image capture device 106 is selected as the world coordinate system, the rotation between the first, third, and fourth image capture devices 104, 106, 110 (e.g., as determined by the image capture device parameter analyzer 264) can be used to transform the 3D pose of the subject based on the rotation on the world coordinate system defined by the second image capture device 106.

The example 3D model generator 136 of FIG. 2 includes a communicator 272. The communicator 272 provides means for outputting the post-processing 3D skeleton data 270 to, for instances, the user application(s) 138 of the user device 132 of FIG. 1. The post-processing 3D skeleton data 270 can be used for applications such as biomechanical analysis of athletes, 3D character animation for movies and games, human-machine interaction analysis, and/or human behaviors recognition analysis. The communicator 272 of FIG. 2 can output the post-processing 3D skeleton data 270 via one or more wired or wireless communication protocols.

While an example manner of implementing the 3D model generator 136 of FIG. 1 is illustrated in FIG. 2, one or more of the elements, processes and/or devices illustrated in FIG. 2 may be combined, divided, re-arranged, omitted, eliminated and/or implemented in any other way. Further, the example database 208, the example image capture device controller 210, the image synchronizer 214, the example 2D pose detector 216, the example 3D pose calculator 218, the example image capture device parameter analyzer 264, the example communicator 272, and/or, more generally, the example 3D model generator 136 of FIG. 2 may be implemented by hardware, software, firmware and/or any combination of hardware, software and/or firmware. Thus, for example, any of the example database 208, the example image capture device controller 210, the image synchronizer 214, the example 2D pose detector 216, the example 3D pose calculator 218, the example image capture device parameter analyzer 264, the example communicator 272, and/or, more generally, the example 3D model generator 136 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example database 208, the example image capture device controller 210, the image synchronizer 214, the example 2D pose detector 216, the example 3D pose calculator 218, the example image capture device parameter analyzer 264, and/or the example communicator 272 is/are hereby expressly defined to include a non-transitory computer readable storage device or storage disk such as a memory, a digital versatile disk (DVD), a compact disk (CD), a Blu-ray disk, etc. including the software and/or firmware. Further still, the example 3D model generator 136 of FIGS. 1 and/or 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

While an example manner of implementing the first computing system 220 is illustrated in FIG. 2, one or more of the elements, processes and/or devices illustrated in FIG. 2 may be combined, divided, re-arranged, omitted, eliminated and/or implemented in any other way. Further, the example neural network processor 222, the example trainer 226, the example training controller 228, the example database(s) 232, 236 and/or, more generally, the example first computing system 220 of FIG. 2 may be implemented by hardware, software, firmware and/or any combination of hardware, software and/or firmware. Thus, for example, any of the example neural network processor 222, the example trainer 226, the example training controller 228, the example database(s) 232, 236 and/or, more generally, the example first computing system 220 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example neural network processor 222, the example trainer 226, the example training controller 228, and/or the example database(s) 232, 236 is/are hereby expressly defined to include a non-transitory computer readable storage device or storage disk such as a memory, a digital versatile disk (DVD), a compact disk (CD), a Blu-ray disk, etc. including the software and/or firmware. Further still, the example first computing system 220 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

While an example manner of implementing the second computing system 246 is illustrated in FIG. 2, one or more of the elements, processes and/or devices illustrated in FIG. 2 may be combined, divided, re-arranged, omitted, eliminated and/or implemented in any other way. Further, the example neural network processor 248, the example trainer 250, the example training controller 252, the example database(s) 256, 260 and/or, more generally, the example second computing system 246 of FIG. 2 may be implemented by hardware, software, firmware and/or any combination of hardware, software and/or firmware. Thus, for example, any of the example neural network processor 248, the example trainer 250, the example training controller 252, the example database(s) 256, 260 and/or, more generally, the example second computing system 246 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example neural network processor 248, the example trainer 250, the example training controller 252, and/or the example database(s) 256, 260 is/are hereby expressly defined to include a non-transitory computer readable storage device or storage disk such as a memory, a digital versatile disk (DVD), a compact disk (CD), a Blu-ray disk, etc. including the software and/or firmware. Further still, the example second computing system 246 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 12:
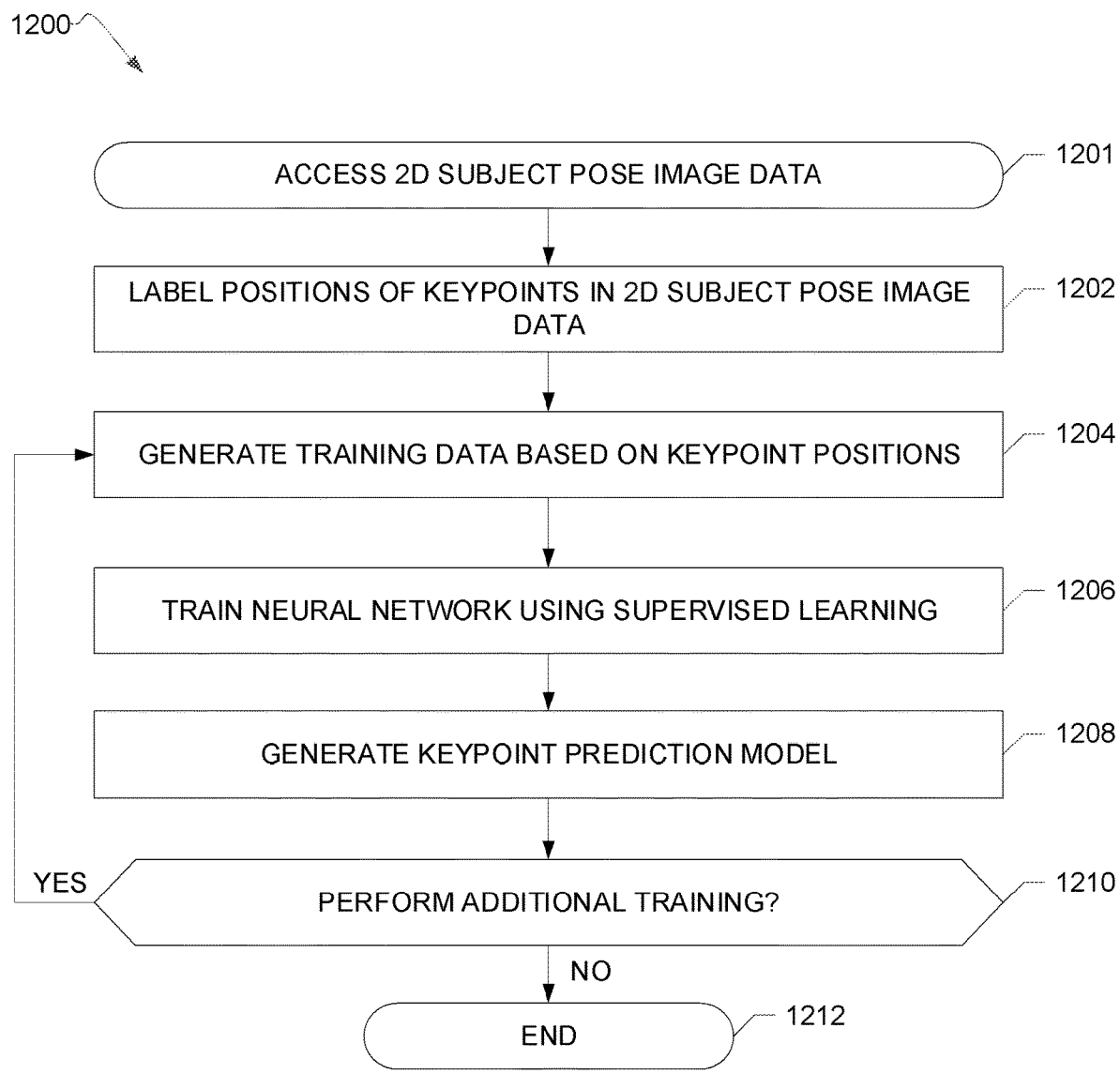
FIG. 12 is a flowchart representative of example machine readable instructions that, when executed by a first computing system of the example system of FIG. 2, cause the first computing system to train a neural network to predict positions of keypoints of a subject in image data.
Figure 13:
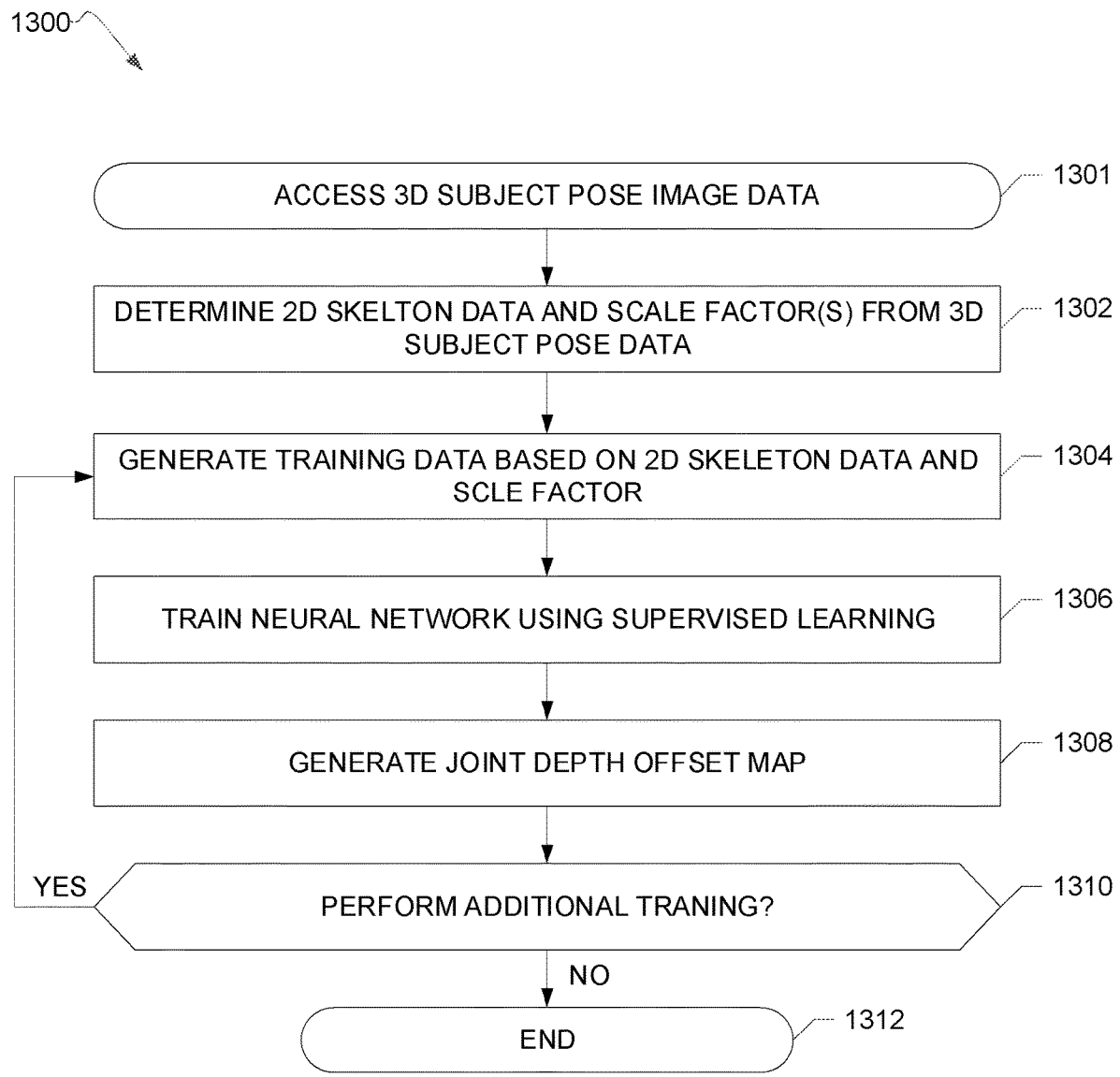
FIG. 13 is a flowchart representative of example machine readable instructions that, when executed by a second computing system of the example system of FIG. 2, cause the second computing system to train a neural network to perform a mapping of 2D skeleton data to a joint depth offset map.
Figure 14:
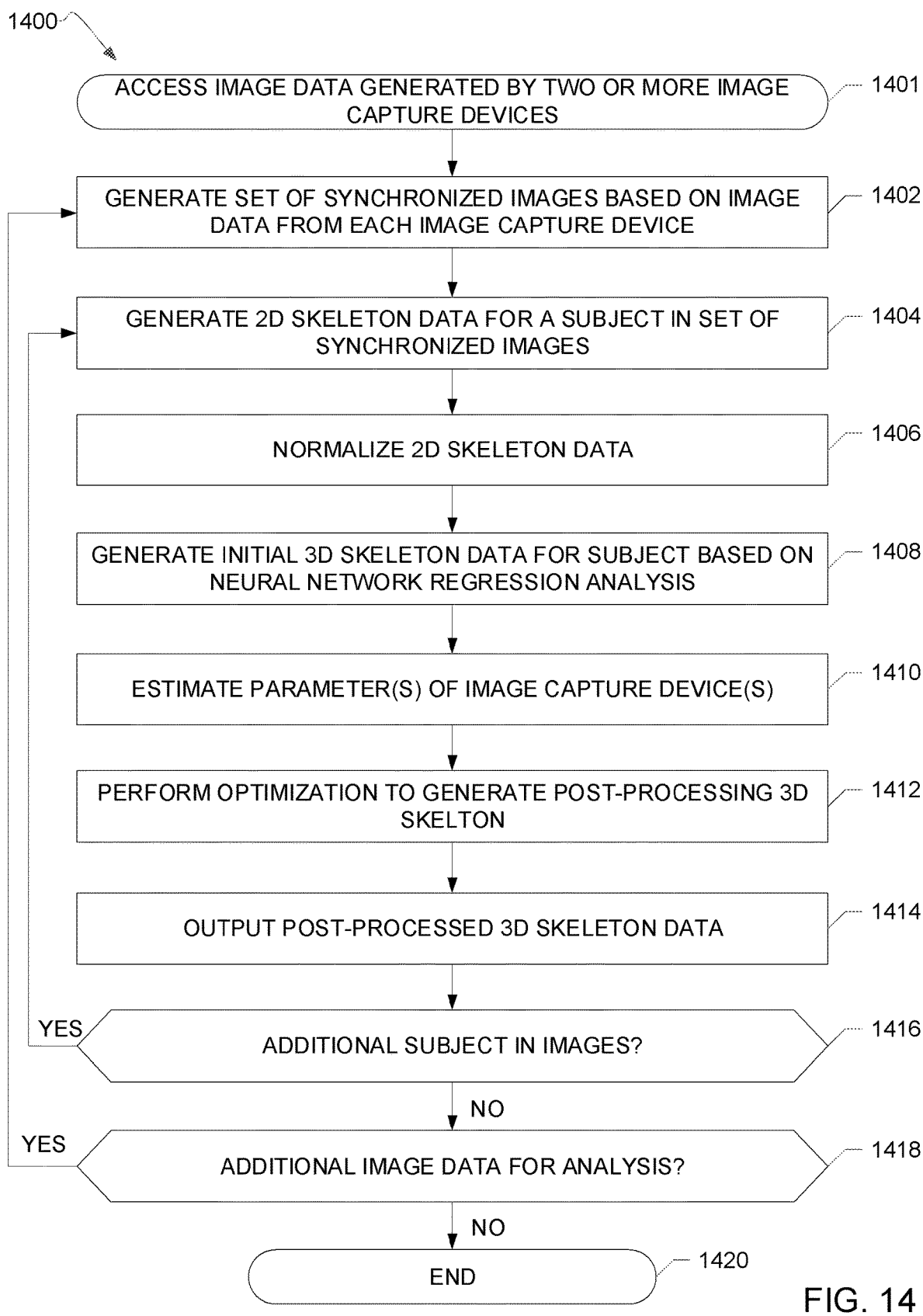
FIG. 14 is a flowchart representative of example machine readable instructions that, when executed, cause the example 3D model generator of FIGS. 1 and/or 2 to generate 3D graphical model(s) of subject(s) based on image data.

A flowchart representative of example hardware logic, machine readable instructions, hardware implemented state machines, and/or any combination thereof for implementing the example first computing system 220 of FIG. 2 is shown in FIG. 12. A flowchart representative of example hardware logic, machine readable instructions, hardware implemented state machines, and/or any combination thereof for implementing the example second computing system 246 of FIG. 2 is shown in FIG. 13. A flowchart representative of example hardware logic, machine readable instructions, hardware implemented state machines, and/or any combination thereof for implementing the example 3D model generator 136 of FIGS. 1 and/or 2 is shown in FIG. 14. The machine readable instructions of FIGS. 12-14 may be one or more executable programs or portion(s) of an executable program for execution by a computer processor and/or processor circuitry, such as the processors 1512, 1612, 1712 shown in the example processor platforms 1500, 1600, 1700 discussed below in connection with FIGS. 15-17. The program may be embodied in software stored on a non-transitory computer readable storage medium such as a CD-ROM, a floppy disk, a hard drive, a DVD, a Blu-ray disk, or a memory associated with the processor(s) 1512, 1612, 1712, but the entire program and/or parts thereof could alternatively be executed by a device other than the processor(s) 1512, 1612, 1712 and/or embodied in firmware or dedicated hardware. Further, although the example program is described with reference to the flowcharts illustrated in FIG. 12-14, many other methods of implementing the example first computing system 220, the example second computing system 246, and/or the example 3D model generator 136 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 12-14 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 12 is a flowchart representative of example machine readable instructions 1200 that, when executed by the example first computing system 220 of FIG. 2, cause the example first computing system 220 to train a neural network to the identify position of keypoints or joints of a subject in 2D image data. The example instructions 1200 of FIG. 12, when executed by the first computing system 220 of FIG. 2, results in a neural network and/or a model thereof, that can be distributed to other computing systems, such as the 2D pose detector 216 of FIG. 2.

The example instructions 1200 of FIG. 12 begin with the training controller 228 accessing 2D subject pose image data stored in the example database 232 (block 1201). The 2D subject pose image data can include previously generated image data for subject(s) in different pose(s).

The example training controller 228 labels the positions of the keypoints (e.g., (X, Y) coordinates) in the 2D subject pose image data based on, for example, image recognition techniques that cause the training controller 228 to identify joints in the image data (block 1202). The example training controller 228 generates the training data 230 based on the positions of the keypoints in the labeled image data (block 1204).

The example training controller 228 instructs the neural network trainer 226 to perform training of the neural network 222 using the training data 230 (block 1206). In the example of FIG. 12, the training is based on supervised learning. As a result of the training, the keypoint prediction model 234 is generated (block 1208). Based on the keypoint prediction model 234, the neural network is trained to predict 2D (X, Y) positions of keypoints of a subject in image data. The keypoint prediction model 234 can be stored in the database 236 for access by the 2D pose detector 216 of the 3D model generator 136. The example instructions 1200 of FIG. 12 end when no additional training (e.g., retraining) is to be performed (blocks 1210, 1212).

FIG. 13 is a flowchart representative of example machine readable instructions 1300 that, when executed by the example second computing system 246 of FIG. 2, cause the example second computing system 246 to train a neural network to learn a mapping from normalized 2D skeleton data including 2D joint coordinates to 3D joint coordinates using a depth offset map, where the depth offset map indicates a depth offset from a joint to a root joint (e.g., the pelvis joint). The example instructions 1300 of FIG. 13, when executed by the second computing system 246 of FIG. 2, results in a neural network and/or a model thereof, that can be distributed to other computing systems, such as the 3D pose calculator 218 of FIG. 2.

The example of FIG. 13 begins with the training controller 252 of the second computing system 246 accessing 3D subject pose image data stored in the example database 256 (block 1301). The 3D subject pose image data can include previously generated 3D image data including subject(s) in different pose(s).

The example training controller 252 determines 2D skeleton data for each ground truth pelvis-centered 3D skeleton data (e.g., where the pelvis joint is the root joint and ground truth refers to known joint locations relative to the pelvis joint) (block 1302). In FIG. 13, the training controller 252 normalizes the 2D skeleton data to obtain scale factor(s). The example training controller 252 generates the training data 254 based on the 2D normalized skeletons and the scale factor(s) (block 1304).

The example training controller 252 instructs the neural network trainer 250 to perform training of the neural network 248 using the training data 254 (block 1306). In the example of FIG. 13, the training is based on supervised learning. As a result of the training, the joint depth offset model 258 is generated (block 1308). Based on the joint depth offset model 258, the neural network is trained to learn the mapping between the joint coordinates in the normalized 2D skeleton data and the depth offset for the joints to predict 3D joint positions. The joint depth offset model 258 can be stored in the database 256 for access by the 3D pose calculator 218 of the 3D model generator 136. The example instructions 1300 of FIG. 13 end when no additional training (e.g., retraining) is to be performed (blocks 1310, 1312).

FIG. 14 is a flowchart representative of example machine readable instructions 1400 that, when executed by the 3D model generator 136 of FIGS. 1 and/or 2, cause the 3D model generator 136 to generate a 3D graphical model (e.g., skeleton) of a subject in a particular pose based on image data generated by two or more uncalibrated image capture devices (e.g., the image capture devices 104, 106, 108, 110 of FIG. 1).

The example instructions 1400 of FIG. 14 begin with the 3D model generator 136 accessing image data 200, 202, 204, 206 generated by the image capture devices 104, 106, 108, 110 (block 1401). The image synchronizer 214 of FIG. 4 extracts images from each of the image data streams 200, 202, 204, 206 and synchronizes the images from each image data streams 200, 202, 204, 206 based on time to generate a (e.g., first) set of synchronized images (block 1402). The image synchronizer 214 can synchronize the images based on, for instance, time-stamps associated with each image.

In the example of FIG. 14, the 2D pose detector 216 of FIG. 2 generates 2D skeleton data 240 for a subject in the set of synchronized images (block 1404). The 2D pose detector 216 predicts the positions (e.g., (X, Y) coordinates) of keypoints or joints of each subject in the images using the neural-network generated keypoint prediction model 234 (e.g., as disclosed in the flowchart of FIG. 12). In some examples, the 2D pose detector 216 generates 2D graphic models or skeletons 600, 602, 604, 606 defined by the predicted locations of the keypoints. The 2D skeleton data 240, 600, 602, 604, 606 is stored in the database 208 of FIG. 2.

In the example of FIG. 14, the 3D pose calculator 218 of FIG. 2 normalizes the 2D skeleton data 240, 600, 602, 604, 606 of FIGS. 2 and 6 generated by the 2D pose detector 216 (block 1406). The normalized 2D skeleton data 244 of FIG. 2 and/or the graphical representations 700, 702, 704, 706 of FIG. 7 generated therefrom are stored in the database 208.

The 3D pose calculator 218 performs a neural network regression analysis to generate initial 3D skeleton data for the subject (block 1408). For example, the 3D pose calculator 218 uses the normalized 2D skeleton data 244, 700, 702, 704, 706, the joint depth offset model 258 generated by the training of the neural network 248 (e.g., as disclosed in the flowchart of FIG. 13), and a 3D skeleton template to predict the 3D joint coordinates ((X, Y, Z) coordinates) of the keypoints of the subject in the images (e.g., as disclosed in connection with the flow diagrams 400, 500 of FIGS. 4 and 5). The 3D pose calculator 218 generates initial 3D skeleton data 265, 800 of FIGS. 2 and 8 based on the regression analysis.

The example instructions of FIG. 14 account for parameters of the uncalibrated image capture devices 104, 106, 108, 110 that generated the image data, such as intrinsic parameters (e.g., image plane translations) and extrinsic parameters (e.g., orientation and position) of the devices (block 1410). In the example of FIG. 14, the image capture device parameter analyzer 264 estimates the parameters $\Pi=\{R, T, s\}$ of the image capture devices 104, 106, 108, 110, where the parameters R and T refer to coordinate system transformations (e.g., rotation, translation) and s is a scalar factor.

The 3D pose calculator 218 performs post-processing on the initial 3D skeleton data 265, 800 to increase an accuracy of the 3D pose represented by the 3D graphical model (block 1412). The 3D pose calculator 218 can perform the post-processing by performing an optimization to identify an optimal skeleton joint rotation vector $\theta$ and optimal image device capture parameters H as disclosed in connection Equations 2-6, above. As a result of the optimization, the 3D pose calculator 218 generates a final 3D graphical model 1100 that is projected onto a world coordinate system corresponding to a coordinate system of one of the image capture devices 104, 106, 108, 110 (e.g., a coordinate system associated with the first image capture device 104).

The communicator 272 of FIG. 2 transmits the post-processed 3D graphical models or skeletons via one or more wired or wireless communication protocols to, for example, user application(s) 138 installed on the user device 132 of FIG. 1 (block 1414).

The example instructions of blocks 1402-1412 can be repeated for each subject in the image data generated by the image capture devices (block 1416). In such examples, at block 1404, the 2D pose detector 216 assigns a subject tracker or identifier (e.g., a bounding box) to the respective subjects in the synchronized images to track the respective subjects in each image and/or in subsequent images generated by the image captured device(s) 104, 106, 108, 110.

The example instructions 1400 of FIG. 14 end when there is no further image data to analyze (blocks 1418, 1420).

Figure 15:
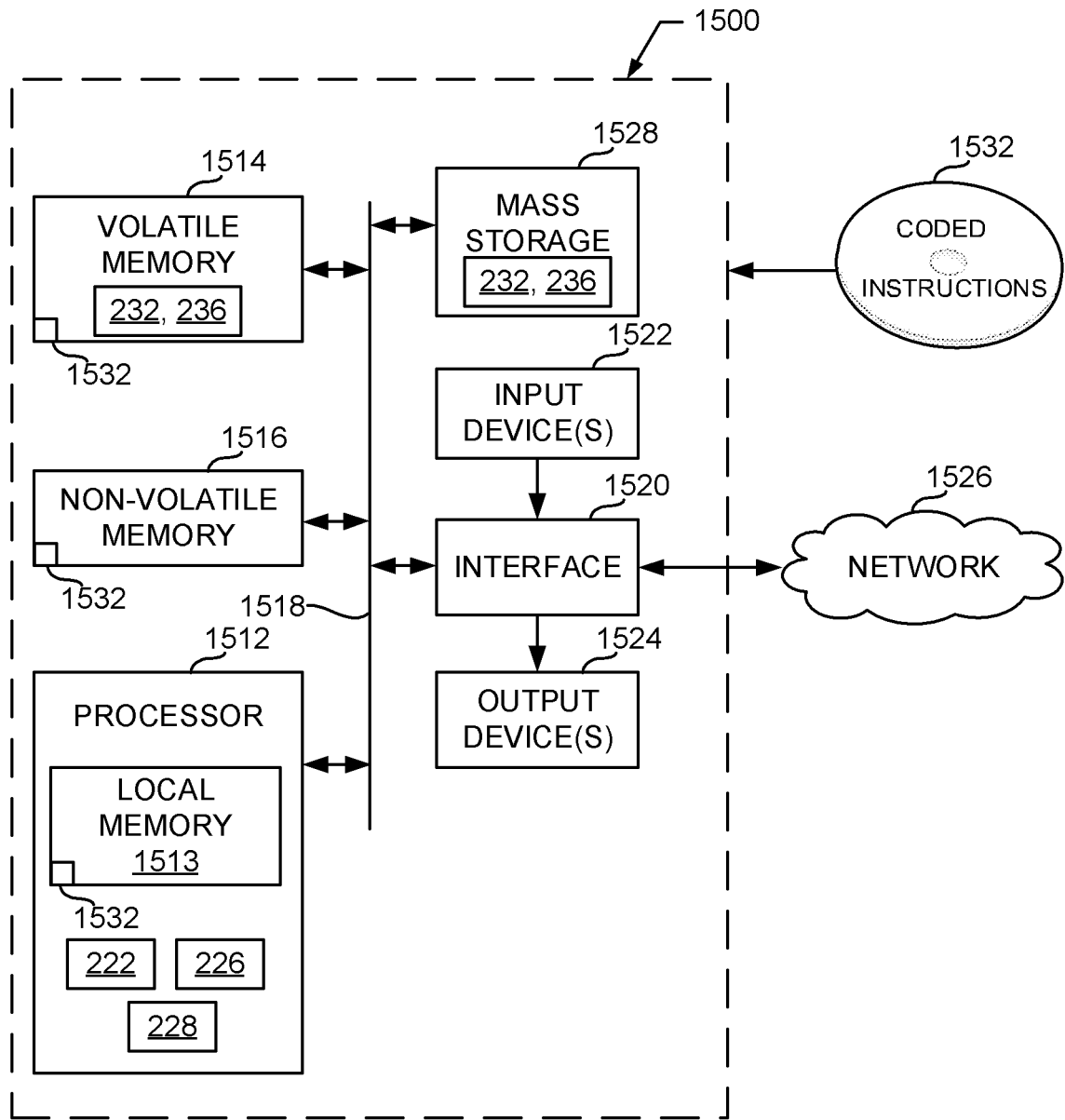
FIG. 15 is a block diagram of an example processing platform structured to execute the instructions of FIG. 12 to implement the example first computing system of FIG. 2.

FIG. 15 is a block diagram of an example processor platform 1500 structured to execute the instructions of FIG. 12 to implement the first computing system 220 of FIG. 2. The processor platform 1500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example neural network processor 222, the example trainer 226, and the example training controller 228.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), a Bluetooth® interface, a near field communication (NFC) interface, and/or a PCI express interface.

In the illustrated example, one or more input devices 1522 are connected to the interface circuit 1520. The input device(s) 1522 permit(s) a user to enter data and/or commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1520 of the illustrated example, thus, typically includes a graphics driver card, a graphics driver chip and/or a graphics driver processor.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, redundant array of independent disks (RAID) systems, and digital versatile disk (DVD) drives.

The machine executable instructions 1532 of FIG. 12 may be stored in the mass storage device 1528, in the volatile memory 1514, in the non-volatile memory 1516, and/or on a removable non-transitory computer readable storage medium such as a CD or DVD.

Figure 16:
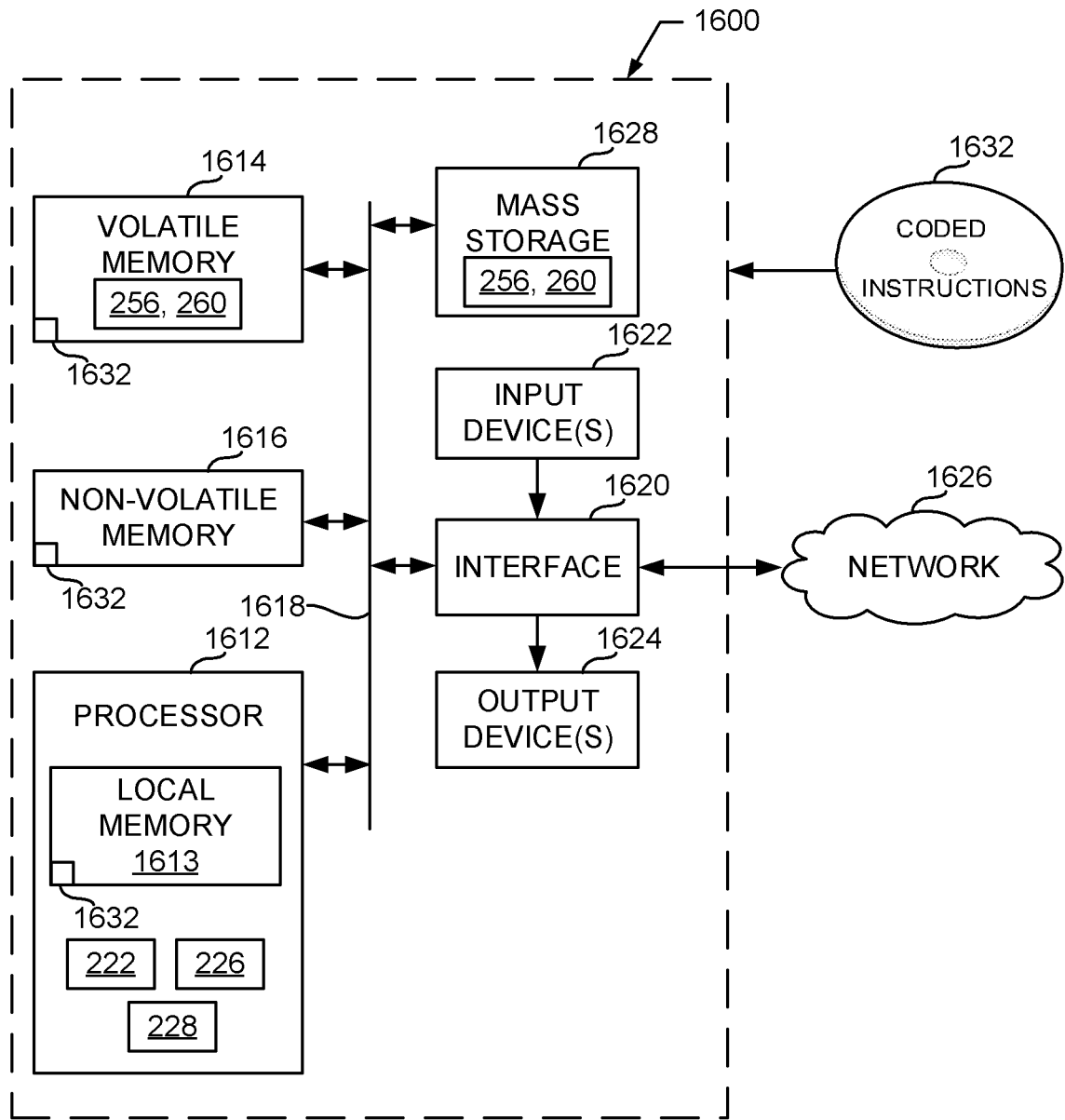
FIG. 16 is a block diagram of an example processing platform structured to execute the instructions of FIG. 12 to implement the example second computing system of FIG. 2.

FIG. 16 is a block diagram of an example processor platform 1600 structured to execute the instructions of FIG. 13 to implement the first computing system 245 of FIG. 2. The processor platform 1600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example neural network processor 248, the example trainer 250, and the example training controller 252.

The processor 1612 of the illustrated example includes a local memory 1613 (e.g., a cache). The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), a Bluetooth® interface, a near field communication (NFC) interface, and/or a PCI express interface.

In the illustrated example, one or more input devices 1622 are connected to the interface circuit 1620. The input device(s) 1622 permit(s) a user to enter data and/or commands into the processor 1612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1620 of the illustrated example, thus, typically includes a graphics driver card, a graphics driver chip and/or a graphics driver processor.

The interface circuit 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, redundant array of independent disks (RAID) systems, and digital versatile disk (DVD) drives.

The machine executable instructions 1632 of FIG. 13 may be stored in the mass storage device 1628, in the volatile memory 1614, in the non-volatile memory 1616, and/or on a removable non-transitory computer readable storage medium such as a CD or DVD.

Figure 17:
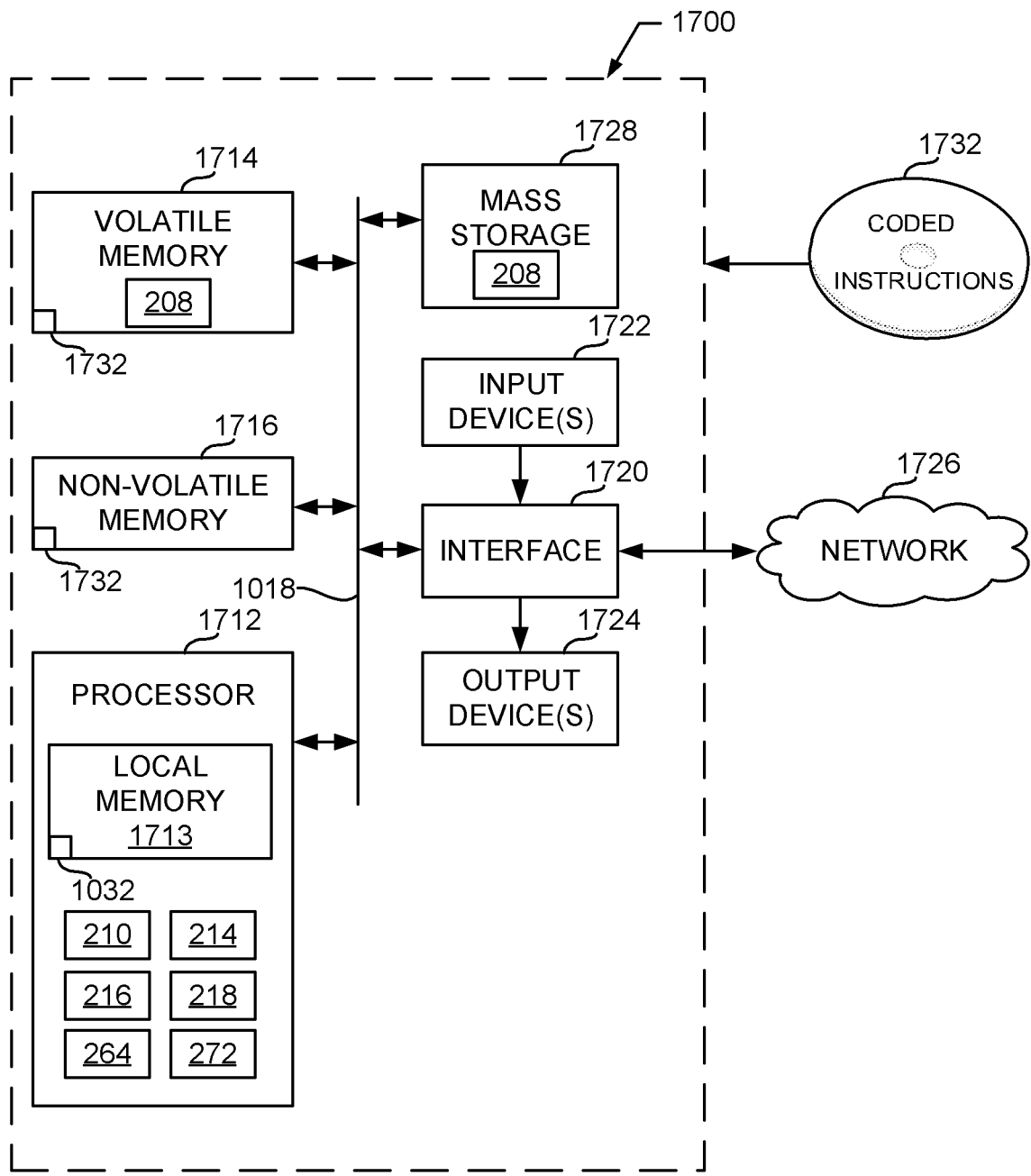
FIG. 17 is a block diagram of an example processing platform structured to execute the instructions of FIG. 14 to implement the example 3D model generator of FIGS. 1 and/or 2.

FIG. 17 is a block diagram of an example processor platform 1700 structured to execute the instructions of FIG. 14 to implement the 3D model generator 136 of FIGS. 1 and/or 2. The processor platform 1700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example image capture device controller 210, the image synchronizer 214, the example 2D pose detector 216, the example 3D pose calculator 218, the example image capture device parameter analyzer 264, and the example communicator 272.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), a Bluetooth® interface, a near field communication (NFC) interface, and/or a PCI express interface.

In the illustrated example, one or more input devices 1722 are connected to the interface circuit 1720. The input device(s) 1722 permit(s) a user to enter data and/or commands into the processor 1712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1720 of the illustrated example, thus, typically includes a graphics driver card, a graphics driver chip and/or a graphics driver processor.

The interface circuit 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, redundant array of independent disks (RAID) systems, and digital versatile disk (DVD) drives.

The machine executable instructions 1732 of FIG. 14 may be stored in the mass storage device 1728, in the volatile memory 1714, in the non-volatile memory 1716, and/or on a removable non-transitory computer readable storage medium such as a CD or DVD.

Figure 18:
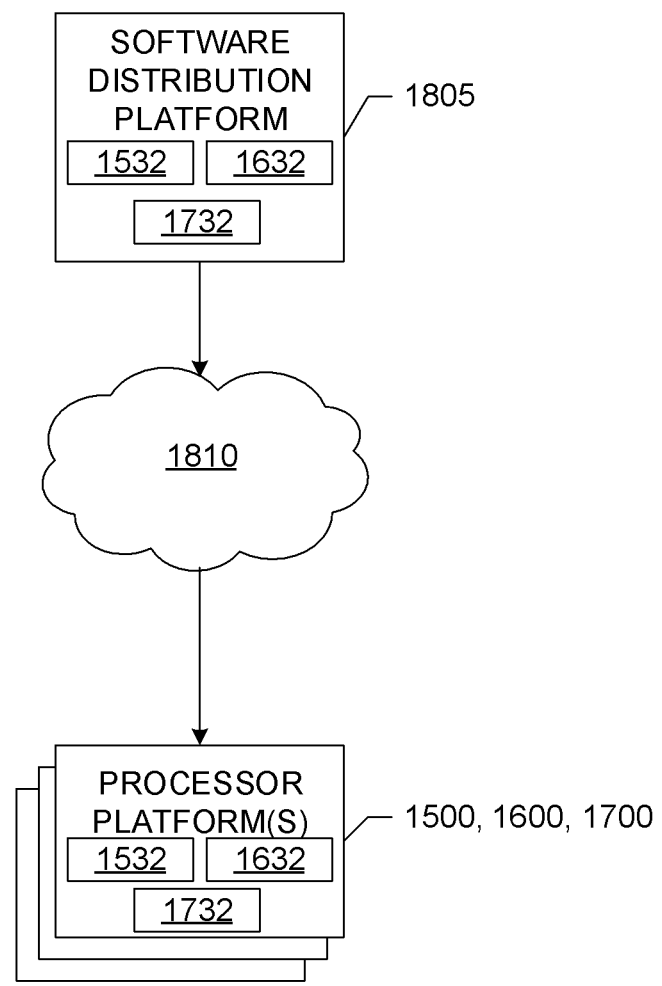
FIG. 18 is a block diagram of an example software distribution platform to distribute software (e.g., software corresponding to the example computer readable instructions of FIGS. 12, 13, and/or 14) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1805 to distribute software such as the example computer readable instructions 1532 of FIG. 15, the example computer readable instructions 1632 of FIG. 16, and/or the example computer readable instructions 1732 of FIG. 17 to third parties is illustrated in FIG. 18. The example software distribution platform 1805 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1532, 1632, 1732 of FIGS. 15, 16, and/or 17. The third parties may be consumers, users, retailers, OEMs, etc., who purchase and/or license the software for use and/or re-sale and/or sub-licensing. In the illustrated example, the software distribution platform 1805 includes one or more servers and one or more storage devices. The storage devices store the respective computer readable instructions 1532, 1632, 1732, which may correspond to the example computer readable instructions 1200 of FIG. 12, the example computer readable instructions 1300 of FIG. 13, or the example computer readable instructions 1400 of FIG. 14, respectively, as described above. The one or more servers of the example software distribution platform 1805 are in communication with a network 1810, which may correspond to any one or more of the Internet and/or any of the example networks 1726 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1732 from the software distribution platform 1805. For example, the software, which may correspond to the example computer readable instructions 1400 of FIG. 14, may be downloaded to the example processor platform 1700, which is to execute the computer readable instructions 1732 to implement the example 3D model generator 136 of FIGS. 1 and/or 2. In some examples, one or more servers of the software distribution platform 1805 periodically offer, transmit, and/or force updates to the software (e.g., the example computer readable instructions 1732 of FIG. 17) to ensure improvements, patches, updates, etc. are distributed and applied to the software at the end user devices.

From the foregoing, it will be appreciated that example methods, apparatus and articles of manufacture have been disclosed that provide for 3D pose estimation of a subject from image data generated by image capture devices without performing calibration of the image capture devices. Examples disclosed herein execute a neural network model to identify 2D keypoints or joints in the image data. Examples disclosed herein predict the 3D coordinates of the joints using a neural network regression analysis to generate 3D graphical model(s) of the subject in a pose. The 3D graphical model(s) are refined via optimization that accounts for parameters of the image capture devices to generate the 3D graphical model(s) that accurately represent the subject's pose as captured by the multi-view image capture devices. Examples disclosed herein can be implemented in environments in which image capture devices are operated with changing zoom levels and/or changing device positions such as sporting events to identify poses of subjects under dynamic conditions.

Example methods, apparatus, systems, and articles of manufacture to implement three-dimensional pose estimation are disclosed herein. Further examples and combinations thereof include the following:

Example 1 includes an apparatus including an image synchronizer to synchronize a first image generated by a first image capture device and a second image generated by a second image capture device based on time, the first image including a subject and the second image including the subject; a two-dimensional pose detector to: predict first positions of keypoints of the subject based on the first image and by executing a first neural network model to generate first two-dimensional data; and predict second positions of the keypoints of the subject based on the second image and by executing the first neural network model to generate second two-dimensional data; and a three-dimensional pose calculator to generate a three-dimensional graphical model representing a pose of the subject in the first image and the second image based on the first two-dimensional data and the second two-dimensional data and by executing a second neural network model.

Example 2 includes the apparatus as defined in example 1, further including an image capture device parameter analyzer to predict a parameter of the first image capture device, the three-dimensional pose calculator to generate the three-dimensional model based on the parameter of the first image capture device.

Example 3 includes the apparatus as defined in example 2, wherein the parameter is associated with a rotation or a translation of the first image capture device relative to a coordinate system.

Example 4 includes the apparatus as defined in examples 1 or 2, wherein the second neural network model implements a regression function.

Example 5 includes the apparatus as defined in example 4, wherein the three-dimensional pose calculator is to predict a three-dimensional coordinate of a first joint of the subject based on the regression function.

Example 6 includes the apparatus as defined in example 1, wherein the three-dimensional pose calculator is to perform an optimization to generate the three-dimensional model.

Example 7 includes the apparatus as defined in examples 1, 2, or 5, wherein at least one of the first image capture device or the second image capture device is an uncalibrated image capture device.

Example 8 includes the apparatus as defined in example 1, wherein the three-dimensional pose calculator is to normalize the first two-dimensional data to generate first normalized two-dimensional data and normalize the second two-dimensional data to generate second normalized two-dimensional data, the three-dimensional pose calculator to generate the three-dimensional model based on the first normalized two-dimensional data and the second normalized two-dimensional data.

Example 9 includes the apparatus as defined in example 1, wherein the three-dimensional model is projected onto a world coordinate system defined by a coordinate system of one of the first image capture device or the second image capture device.

Example 10 includes the at least one non-transitory computer readable medium comprising instructions that, when executed, cause at least one processor to at least: predict two-dimensional coordinates of respective joints of a subject in a first image generated by a first image capture device to generate first two-dimensional pose data; predict two-dimensional coordinates of the respective joints of the subject in a second image generated by a second image capture device to generate second two-dimensional pose data; predict a parameter of the first image capture device; generate a first three-dimensional model of the subject in a pose based on the first two-dimensional pose data and the second two-dimensional pose data; execute an optimization algorithm to generate a second three-dimensional model based on the first three-dimensional model and the parameter of the first image capture device; and output the second three-dimensional model for presentation via a user device.

Example 11 includes the at least one non-transitory computer readable medium as defined in example 10, wherein the instructions, when executed, cause the at least one processor to predict the two-dimensional coordinates of the respective joints of the subject in the first image by executing a first neural network model.

Example 12 includes the at least one non-transitory computer readable medium as defined in examples 10 or 11, wherein the instructions, when executed, cause the at least one processor to generate the first three-dimensional model by executing a second neural network model.

Example 13 includes the at least one non-transitory computer readable medium as defined in example 12, wherein the instructions, when executed, cause the at least one processor to predict three-dimensional coordinates of the respective joints of the subject in response to execution of the second neural network model.

Example 14 includes the at least one non-transitory computer readable medium as defined in example 10, wherein the first image capture device is a camera and the parameter is an extrinsic parameter of the camera.

Example 15 includes the at least one non-transitory computer readable medium as defined in examples 10, 11, or 14, wherein the instructions, when executed, cause the at least one processor to: extract the first image from first image data generated by the first image capture device; extract the second image from second image data generated by the second image capture device; and synchronize the first image and the second image based on time.

Example 16 includes the at least one non-transitory computer readable medium as defined in example 15, wherein the first image is a first video frame and the second image is a second video frame.

Example 17 includes the at least one non-transitory computer readable medium as defined in example 15, wherein the subject is a first subject and the instructions, when executed, cause the at least one processor to generate a third three-dimensional model for a second subject in the first image and the second image.

Example 18 includes an apparatus including means for predicting a two-dimensional pose of a subject based on first image data generated by a first image capture device and second image data generated by a second image capture device; means for predicting a parameter of the first image capture device; and means for generating a three-dimensional graphical model of the subject based on the predicted two-dimensional pose and the predicted parameter of the first image capture device.

Example 19 includes the apparatus as defined in example 18, wherein the means for predicting the two-dimensional pose is to predict the two-dimensional pose of the subject by executing a first neural network model.

Example 20 includes the apparatus as defined in example 19, wherein the means for generating is to generate the three-dimensional graphical model by executing a second neural network model.

Example 21 includes the apparatus as defined in example 20, wherein the second neural network implements a regression function.

Example 22 includes the apparatus as defined in example 18, wherein the means for generating is to determine a joint rotation vector and generate the three-dimensional graphical model based on the joint rotation vector.

Example 23 includes At least one non-transitory computer readable medium including instructions that, when executed, cause at least one processor to at least: generate a first neural network model to predict a two-dimensional pose of a subject in a first image generated by a first image capture device and in a second image generated by a second image capture device, respectively; and generate a second neural network model to predict a three-dimensional pose of the subject, the predicted three-dimensional pose to be used to generate a three-dimensional graphical model of the subject in the pose.

Example 24 includes the at least one non-transitory computer readable medium as defined in example 23, wherein the second neural network model is to implement a regression function.

Example 25 includes the at least one non-transitory computer readable medium as defined in examples 23 or 24, wherein the second neural network model is to define an offset between a first joint of the subject and a reference joint of the subject.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   memory;
   machine-readable instructions; and
   at least one processor circuit to be programmed by the machine-readable instructions to:
   synchronize a first image generated by a first image capture device and a second image generated by a second image capture device based on time, the first image including a subject and the second image including the subject;
   execute a first neural network model to generate first two-dimensional position data, the first two-dimensional position data including predicted first positions of keypoints of the subject based on the first image, the keypoints corresponding to joints of the subject;
   execute the first neural network model to generate second two-dimensional position data, the second two-dimensional position data including predicted second positions of the keypoints of the subject based on the second image;
   execute a second neural network model to predict three-dimensional coordinates of respective joints of the subject based on the first two-dimensional position data and the second two-dimensional position data, the second neural network model to apply a depth offset between a first joint of the subject relative to a second joint of the subject to predict a three-dimensional coordinate for the first joint; and
   generate a three-dimensional graphical model based on the three-dimensional coordinates of the respective joints, the three-dimensional graphical model representing a pose of the subject in the first image and the second image.

2. The apparatus as defined in claim 1, wherein one or more of the at least one processor circuit is to:
   predict a parameter of the first image capture device; and
   generate the three-dimensional graphical model based on the parameter of the first image capture device.

3. The apparatus as defined in claim 2, wherein the parameter is associated with a rotation or a translation of the first image capture device relative to a coordinate system.

4. The apparatus as defined in claim 1, wherein the second neural network model implements a regression function.

5. The apparatus as defined in claim 4, wherein one or more of the at least one processor circuit is to predict the three-dimensional coordinates of a first joint of the subject based on the regression function.

6. The apparatus as defined in claim 1, wherein one or more of the at least one processor circuit is to perform an optimization to generate the three-dimensional graphical model.

7. The apparatus as defined in claim 1, wherein at least one of the first image capture device or the second image capture device is an uncalibrated image capture device.

8. The apparatus as defined in claim 1, wherein one or more of the at least one processor circuit is to:
   normalize the first two-dimensional data to generate first normalized two-dimensional data and normalize the second two-dimensional data to generate second normalized two-dimensional data; and
   generate the three-dimensional graphical model based on the first normalized two-dimensional data and the second normalized two-dimensional data.

9. The apparatus as defined in claim 1, wherein one or more of the at least one processor circuit is to cause the three-dimensional graphical model to be projected onto a world coordinate system defined by a coordinate system of one of the first image capture device or the second image capture device.

10. At least one non-transitory machine readable medium comprising machine readable instructions to cause at least one processor circuit to at least:

synchronize a first image generated by a first image capture device and a second image generated by a second image capture device based on time, the first image including a subject and the second image including the subject;

execute a first neural network model to generate first two-dimensional position data, the first two-dimensional position data including predicted first two-dimensional coordinates of respective joints of a subject based on the first image;

execute the first neural network model to generate second two-dimensional position data, the second two-dimensional position data including predicted second two-dimensional coordinates of the respective joints of the subject based on the second image;

execute a second neural network model to predict three-dimensional coordinates of respective joints of the subject based on the first two-dimensional position data and the second two-dimensional position data, the second neural network model to apply a depth offset between a first joint of the subject relative to a second joint of the subject to predict a three-dimensional coordinate for the first joint; and generate a three-dimensional graphical model based on the three-dimensional coordinates of the respective joints, the three-dimensional graphical model representing a pose of the subject in the first image and the second image.

11. The at least one non-transitory machine readable medium as defined in claim 10, wherein the machine readable instructions are to cause one or more of the at least one processor circuit to generate the first three-dimensional graphical model by executing a second neural network model.

12. The at least one non-transitory machine readable medium as defined in claim 10, wherein at least one of the first image capture device or the second image capture device is an uncalibrated image capture device.

13. The at least one non-transitory machine readable medium as defined in claim 10, wherein;

the subject is a first subject and the machine readable instructions are to cause one or more of the at least one processor circuit to generate a second three-dimensional graphical model for a second subject in the first image and the second image.

14. The at least one non-transitory machine readable medium as defined in claim 10, wherein the second neural network model implements a regression function and the machine readable instructions are to cause one or more of the at least one processor circuit to predict the three-dimensional coordinates of a first joint of the subject based on the regression function.

15. The at least one non-transitory machine readable medium as defined in claim 10, wherein the machine readable instructions are to cause one or more of the at least one processor circuit to:

normalize the first two-dimensional data to generate first normalized two-dimensional data and normalize the second two-dimensional data to generate second normalized two-dimensional data; and generate the three-dimensional graphical model based on the first normalized two-dimensional data and the second normalized two-dimensional data.

16. The at least one non-transitory machine readable medium as defined in claim 10, wherein the machine readable instructions are to cause one or more of the at least one processor circuit to project the three-dimensional graphical model onto a world coordinate system defined by a coordinate system of one of the first image capture device or the second image capture device.

17. The at least one non-transitory machine readable medium as defined in claim 10, wherein the machine readable instructions are to cause one or more of the at least one processor circuit to:

execute an optimization algorithm to generate a second three-dimensional model based on the three-dimensional model and a parameter of the first image capture device; and output the second three-dimensional model for presentation via a user device.

18. The at least one non-transitory machine readable medium as defined in claim 17, wherein the parameter is associated with a rotation or a translation of the first image capture device relative to a coordinate system.

19. The at least one non-transitory machine readable medium as defined in claim 17, wherein the machine readable instructions are to cause one or more of the at least one processor circuit to predict the parameter of the first image capture device.

20. The at least one non-transitory machine readable medium as defined in claim 17, wherein the first image capture device is a camera and the parameter is an extrinsic parameter of the camera.

* * * * *

UNITED STATES PATENT AND TRADEMARK OFFICE
CERTIFICATE OF CORRECTION

Page 1 of 1

PATENT NO. : 12,299,927 B2
APPLICATION NO. : 18/000389
DATED : May 13, 2025
INVENTOR(S) : Wang et al.

It is certified that error appears in the above-identified patent and that said Letters Patent is hereby corrected as shown below:

In the Drawings

Sheet 8, FIG. 13, in the block labeled with reference numeral 1302, replace "SKELTON" with -- SKELETON --

Sheet 8, FIG. 13, in the block labeled with reference numeral 1304, replace "SCLE" with -- SCALE --

In the Claims

Column 35, Line 39 Claim 11, replace "the first three-dimensional" with -- the three-dimensional --

Signed and Sealed this
Twenty-ninth Day of July, 2025

Coke Morgan Stewart
*Acting Director of the United States Patent and Trademark Office*